(12) United States Patent
Chi et al.

(10) Patent No.: US 9,810,974 B2
(45) Date of Patent: Nov. 7, 2017

(54) TRIPOD FOR PHOTOGRAPHING APPARATUS

(71) Applicant: SAMSUNG ELECTRONICS CO., LTD., Suwon-si, Gyeonggi-do (KR)

(72) Inventors: Eun Ho Chi, Yongin-si (KR); Myung Gyu Kim, Yongin-si (KR); Sang Eon Kim, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/398,048

(22) Filed: Jan. 4, 2017

(65) Prior Publication Data

US 2017/0192344 A1 Jul. 6, 2017

(30) Foreign Application Priority Data

Jan. 5, 2016 (KR) .................. 10-2016-0000799

(51) Int. Cl.

| G03B 17/56 | (2006.01) |
|---|---|
| F16M 11/38 | (2006.01) |
| F16M 11/24 | (2006.01) |
| B29C 45/16 | (2006.01) |
| B29C 45/14 | (2006.01) |
| B29L 9/00 | (2006.01) |

(52) U.S. Cl.
CPC ...... *G03B 17/561* (2013.01); *B29C 45/14811* (2013.01); *B29C 45/1671* (2013.01); *F16M 11/242* (2013.01); *F16M 11/38* (2013.01); *B29C 2045/1673* (2013.01); *B29L 2009/00* (2013.01)

(58) Field of Classification Search
CPC .......... G03B 17/561; B29C 45/14811; B29C 14/1671; F16M 11/242; F16M 11/38
USPC ......................................................... 396/428
See application file for complete search history.

(56) References Cited

U.S. PATENT DOCUMENTS

2009/0026331 A1* 1/2009 Law .................. F16M 11/38
248/163.1

FOREIGN PATENT DOCUMENTS

| JP | 11-258672 | 9/1999 |
|---|---|---|
| KR | 10-2006-0005615 | 1/2006 |
| KR | 10-2006-0121539 | 11/2006 |
| KR | 10-2010-0121087 | 11/2010 |

* cited by examiner

*Primary Examiner* — Rochelle-Ann J Blackman
(74) *Attorney, Agent, or Firm* — Nixon & Vanderhye, P.C.

(57) ABSTRACT

A tripod for a photographing apparatus is provided. The tripod includes a plurality of legs, a bracket, to which the legs are coupled, a support that is coupled to the bracket, and contact members, each of which defines an upper end portion of the corresponding leg. Each contact member includes a first surface provided at an upper end of the contact member and defining a first angle with a longitudinal axis of the leg, and a second surface extending from the first surface and defining a second angle with the first surface. The first surface and the support contact each other when the corresponding leg is in a folding state, and the second surface and the support contact each other when the corresponding leg is in an unfolding state.

19 Claims, 24 Drawing Sheets

TRIPOD FOR PHOTOGRAPHING APPARATUS

CROSS-REFERENCE TO RELATED APPLICATION

This application is based on and claims priority under 35 U.S.C. §119 to a Korean patent application filed on Jan. 5, 2016 in the Korean Intellectual Property Office and assigned Serial number 10-2016-0000799, the disclosure of which is incorporated by reference herein in its entirety.

TECHNICAL FIELD

The present disclosure relates generally to a tripod for a photographing apparatus.

BACKGROUND

In recent years, users who make a self-photographing operation (for example, a selfie) by using a photographing apparatus, such as a camera or a camcorder, or photograph a character, a subject, or a background have been rapidly increasing. In general, when shaking is prevented during a photographing operation or an automatic shutter function is used for photographing, photographing apparatuses may be fixed to tripods.

An existing tripod may be held even through the states of the legs are changed, by pressing the legs to the bracket and fixing the legs through screw members. Further, by applying a rubber to the lower ends of the legs of the tripod, the tripod may be held due to the loads of the screw members and the frictional force, for example, of rubber arranged in the legs. Further, the existing tripod may be configured such that the connection member for connecting the photographing apparatus includes only a screw line, or may include a rotation member of a spherical shape (for example, a ball type) such that the direction of the photographing apparatus may be changed.

However, when the legs of the tripod are pressed to the bracket and are fixed by the screw members, the screw members may be exposed to the outside, deteriorating the quality of the external appearance of the tripod. Even when the rubber is used, the leg may be worn due to repeated frictions, causing the change in the holding angle. Further, when the connection member, to which the photographing apparatus is connected, includes only a screw line, the direction of the photographing apparatus cannot be changed, and the spherical rotation member for changing the direction of the photographing apparatus has a complex configuration, which requires a number of components.

SUMMARY

Example aspects of the present disclosure address at least the above-mentioned problems and/or disadvantages and provide a tripod for a photographing apparatus in which a contact member that contacts a support member coupled to a bracket includes a plurality of surfaces such that the legs of the tripod may define a specific angle with the central axis of the tripod.

The present disclosure further provides a tripod for a photographing apparatus in which a rotation shaft of a leg is seated in a bracket and the leg is coupled to the bracket by applying a load to a contact member through a support member.

The present disclosure also provides a tripod for a photographing apparatus that includes a cover member that covers a portion of a bracket.

The present disclosure also provides a tripod for a photographing apparatus that includes a rotation member that rotates a photographing apparatus.

In accordance with an example aspect of the present disclosure, a tripod for a photographing apparatus includes a plurality of legs, a bracket, to which the legs are coupled, a support coupled to the bracket, and a plurality of contact members, each of which defines an upper end portion of a corresponding leg. Each of the contact members includes a first surface situated at an upper end of the contact member and defining a first angle with a longitudinal axis of the leg, and a second surface defining a second angle with the first surface. The first surface and the support contact each other when the corresponding leg is in a folded state, and the second surface and the support member contact each other when the corresponding leg is in an unfolded state.

Other aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
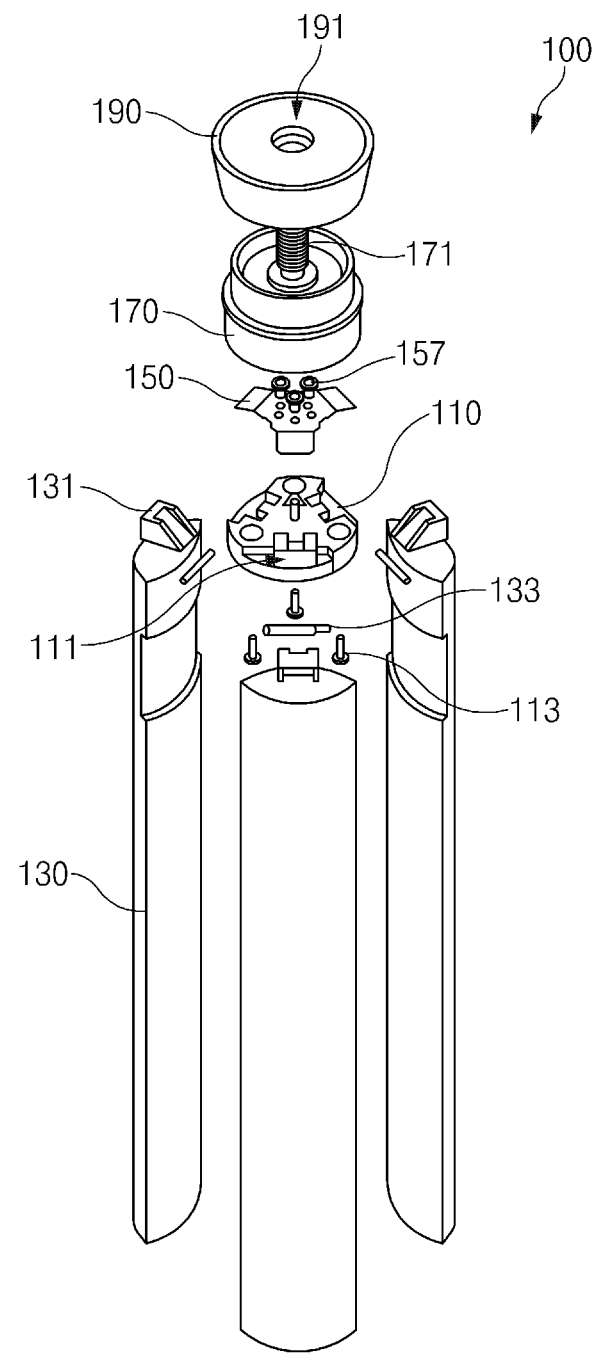
FIG. 1 is an exploded perspective view of a tripod according to an example embodiment.

Hereinafter, various example embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to the bibliographical meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present disclosure are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit), or the like, but is not limited thereto.

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung Home-Sync™, Apple TV™, or Google TV™), a game console (e.g., Xbox™ or PlayStation™), an electronic dictionary, an electronic key, a camcorder, or an electronic picture frame, or the like, but is not limited thereto.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like), or the like, but is not limited thereto.

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like), or the like, but is not limited thereto. An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, a tripod for a photographing apparatus according to various embodiments of the present disclosure will be described in greater detail with reference to the accompanying drawings. The term "user" used herein may refer to a person who uses a tripod or may refer to a device (e.g., an artificial intelligence electronic device) that uses a tripod.

FIG. 1 is an exploded perspective view of a tripod according to an example embodiment of the present disclosure.

Referring to FIG. 1, the tripod 100 may include a bracket 110, legs 130, a support member 150, a cover member 170, and a rotary member 190. However, the configuration of the tripod 100 is not limited thereto. According to various embodiments, the tripod 100 may further include at least one other element, or at least one of the above-described elements may be omitted.

The bracket 110 may fix and support the legs 130 and the support member 150 of the tripod 100. According to an embodiment, the bracket 110 may be substantially cylindrical. However, the present disclosure is not limited thereto. In some embodiments, the bracket 110 may, for example, be a triangular prism shape. Spaces for seating the legs 130 may be arranged at peripheral areas of the bracket 110. In the drawing, openings 111 may be arranged in the peripheral areas of the bracket 110. In this case, each of the legs 130 may be inserted into the corresponding opening 111 from a lower end towards an upper end of the bracket 110 to be seated in the opening 111. A rotation shaft 133 may be inserted along a groove that is arranged adjacent to the opening 111 such that the leg 130 is fixed to the bracket 110 while the leg 130 is inserted into the opening 111 so that the rotation shaft 133 may be coupled to a contact member 131 that is formed at an upper end of the corresponding leg 130. For example, if the leg 130 is inserted into the opening 111, the contact member 131 formed at the upper end of the leg 130 may be exposed to an upper end of the bracket 110, and the rotation shaft 133 may be inserted into and coupled to a through-hole that extends from one side surface to an opposite side surface of the corresponding contact member 131. The number of the openings 111 may be the same as the number of legs 130. For example, at least three openings 111 may be arranged at peripheral areas of the bracket 110 to be spaced apart from each other.

Each of the legs 130 may support the tripod 100 such that the tripod 100 may be held on the ground surface, or may function as a handle when a selfie is captured. At least three legs 130 may be provided in the same or similar way. The longitudinal length of each of the legs 130 may be larger than the transverse length of the leg 130, and if the three legs 130 may be folded such that the central axis of the bracket 110 and the longitudinal axes of the legs 130 are parallel (or the central axis of the bracket 110 and the longitudinal axes of the legs 130 are the same as or similar to the straight angle), side surfaces of the legs 130 may be connected to each other to define a single rod shape. The contact members 131 coupled to the bracket 110 may be arranged at upper end areas of the bracket 110. Each of the contact members 131 may have through-holes on opposite side surfaces thereof such that the corresponding rotation shaft 133 may be inserted through the through-holes.

According to various embodiments, an upper end of the contact member 131, which contacts the support member 150, may have a plurality of surfaces. According to an embodiment, an upper end of the contact member 131 may have a first surface that defines a first angle with the longitudinal axis of the leg 130 and a second surface that defines a second angle with the first surface. According to various embodiments, the first angle may include the right angle. In the case in which the first angle is the right angle, the central axis of the bracket 110 and the longitudinal axis of the leg 130 become parallel to each other if the first surface and the support member 150 contact each other as the leg 130 is rotated about the rotation shaft 133 and a line that is normal to the second surface and the longitudinal axis of the leg 130 defines the second angle if the second surface and the support member 150 contact each other so that the central axis of the bracket 110 and the longitudinal axis of the leg 130 may define a specific angle (for example, an angle that is obtained by subtracting the second angle from the straight angle).

According to various embodiments, an upper end of the contact member 131 may further have at least one other surface, in addition to the first surface and the second surface. For example, an upper end of the contact member 131 may further have a third surface that extends from the second surface and defines a third angle with the second surface.

The support member 150 may support the contact member 131 of the leg 130 while contacting the contact member 131. For example, the support member 150 may apply a load to the contact member 131, and may support the leg 130 such that the leg 130 is not moved as long as an external pressure of a specific magnitude or more is not applied. The support member 150 may be fixed to the bracket 110 through a screw member 157 such as a screw.

According to various embodiments, an area of the support member 150, which contacts the contact member 131, may be formed of a resilient member having a resilient force of a specific magnitude or more. The resilient member, for example, may include a plate-shaped spring. Accordingly, when the leg 130 is rotated about the rotation shaft 133, the resilient member formed in the support member 150 may be deformed (or moved) vertically. For example, the resilient member may maintain the original state while the first surface of the contact member 130 and the support member 150 contact each other, the resilient member may be deformed to the upper side while the leg 130 is unfolded about the rotation shaft 133, and the resilient member may be restored to the original state by a resilient force while a surface that defines a specific angle with the first surface and the support member 150 contact each other.

The cover member 170 may be coupled to the bracket 110 to cover the bracket 110 from an upper side to a lower side. According to an embodiment, the cover member 170 may cover an upper surface and a portion of a side surface of the bracket 110 such that the opening 111 formed at a peripheral area of the bracket 110 is not exposed to the outside. According to various embodiments, the cover member 170 may have a shape that is the same as or similar to the shape of the bracket 110. For example, the cover member 170 may be cylindrical. According to various embodiments, the cover member 170 may be screw-coupled to the bracket 110. According to an embodiment, the cover member 170 may be fixed the bracket 110 by a screw member 113 that is screw-coupled to the bracket 110 from a lower end to an upper end of the bracket 110 while the cover member 170 covers an upper surface and a portion of a side surface of the bracket 110.

According to various embodiments, the cover member 170 may include a connection member 171 to which a photographing apparatus is connected. The connection member 171 may be connected to a photographing apparatus or a holder that fixes the photographing apparatus. According to an embodiment, the connection member 171 may include a screw thread and may be screw-coupled to the photographing apparatus or the holder.

The rotation member 190 may be coupled to the cover member 170 from an upper end and a lower end of the cover member 170. The rotation member 190 may have a through-hole 191 in a specific area such that the connection member 171 provided in the cover member 170 may be exposed to the outside. According to various embodiments, the rotation member 190 may have a screw groove on an inner peripheral surface thereof to be rotatably-coupled to the screw thread formed on an outer surface of the cover member 170. However, the coupling form of the rotation member 190 and the cover member 170 is not limited thereto. In some embodiments, a screw thread may be formed on an inner peripheral surface of the rotation member 190 and a screw groove may be formed on an outer peripheral surface of the cover member 170 such that the rotation member 190 and the cover member 170 are rotatably coupled to each other.

According to various embodiments, the connection member 171, to which the photographing apparatus will be connected, may be formed in the rotation member 190 instead of in the cover member 170. According to an embodiment, the connection member 171 may be fixed to the rotation member 190 while being inserted into the through-hole 191 of the rotation member 190.

Figure 2:
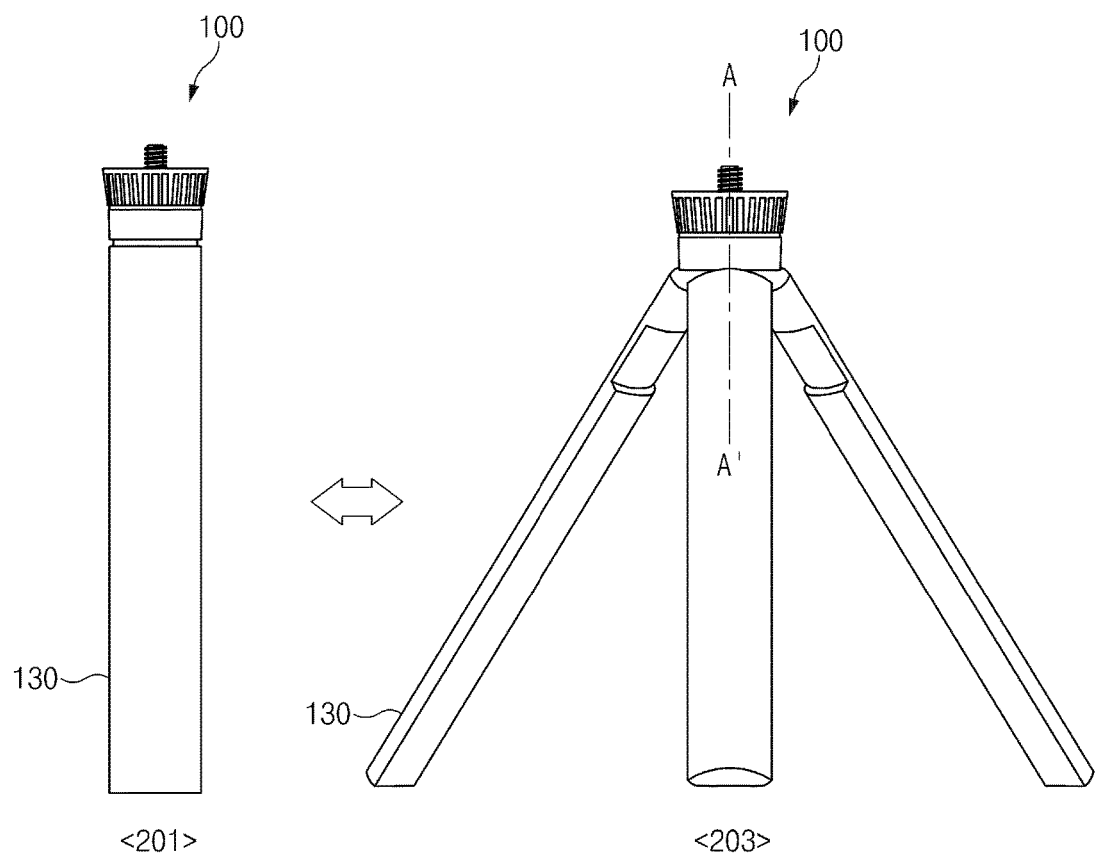
FIG. 2 is a diagram illustrating an example change of the states of the legs of the tripod according to an example embodiment.

FIG. 2 is a diagram illustrating an example of a change of the states of the legs of the tripod according to an example embodiment of the present disclosure.

Referring to FIG. 2, in a first state 201, the tripod 100 may be situated in parallel to the central axis of the bracket 110 as the legs 130 of the tripod 100 are folded. According to various embodiments, when the legs 130 are in a folding state, outer surfaces of the legs 130 may be curved so that side surfaces of the legs 130 are connected to each other such that the legs 130 constitutes a rod shape.

Further, in a second state 203, the legs 130 of the tripod 100 may be unfolded to define a specific angle with the central axis of the bracket 110. When the legs 130 are in an unfolding state, the tripod 100 may be held on the ground surface. According to various embodiments, the angles between the legs 130 and the central axis of the bracket 110 may correspond to angles between lines that are normal to the surfaces of the contact members 131 in contact with the support member 150 and the longitudinal axes of the legs 130. Accordingly, the number of angles at which the legs 130 may be unfolded may be differently set depending on the number of the surfaces of the contact members 131 in contact with the support member 150.

According to various embodiments, the change of the states of the legs 130, such as the first state 201 and the second state 203, may be made by an external pressure of a specific magnitude. The change from the first state 201 to the second state 203 may be made by a force that pulls the legs 130 towards the outer surfaces of the legs 130, and the change from the second state 203 to the first state 201 may be made by a force that pushes the legs 130 towards the inner surfaces of the legs 130.

The shapes and operations of the elements of the tripod 100 will be described through the following embodiments.

Figure 3A:
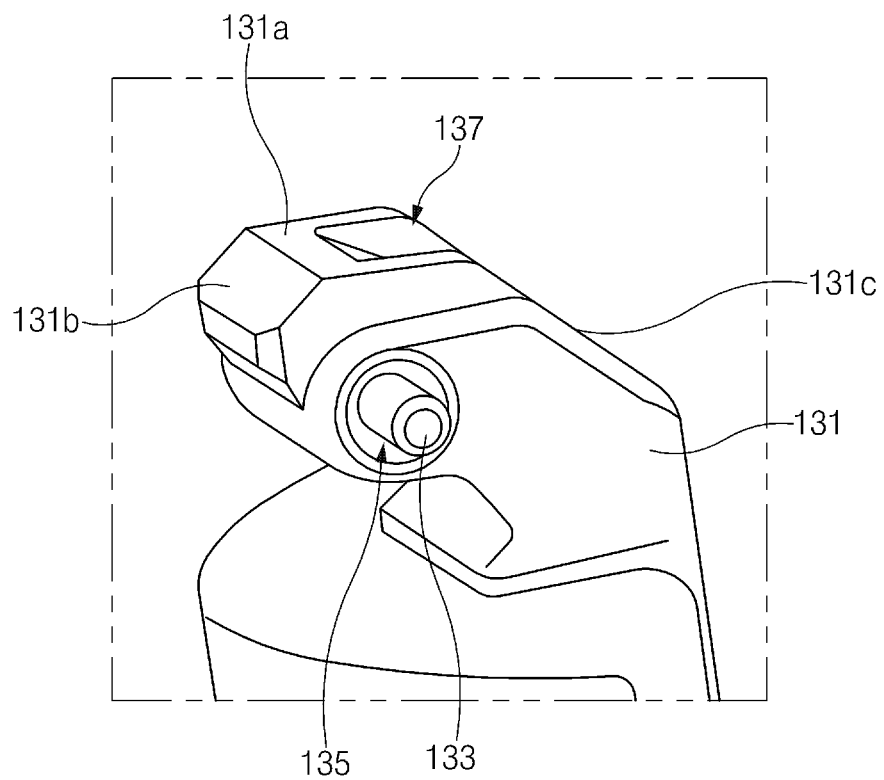
FIG. 3A is a perspective view illustrating the shape of an example contact member of a leg of the tripod according to an example embodiment.
Figure 3B:
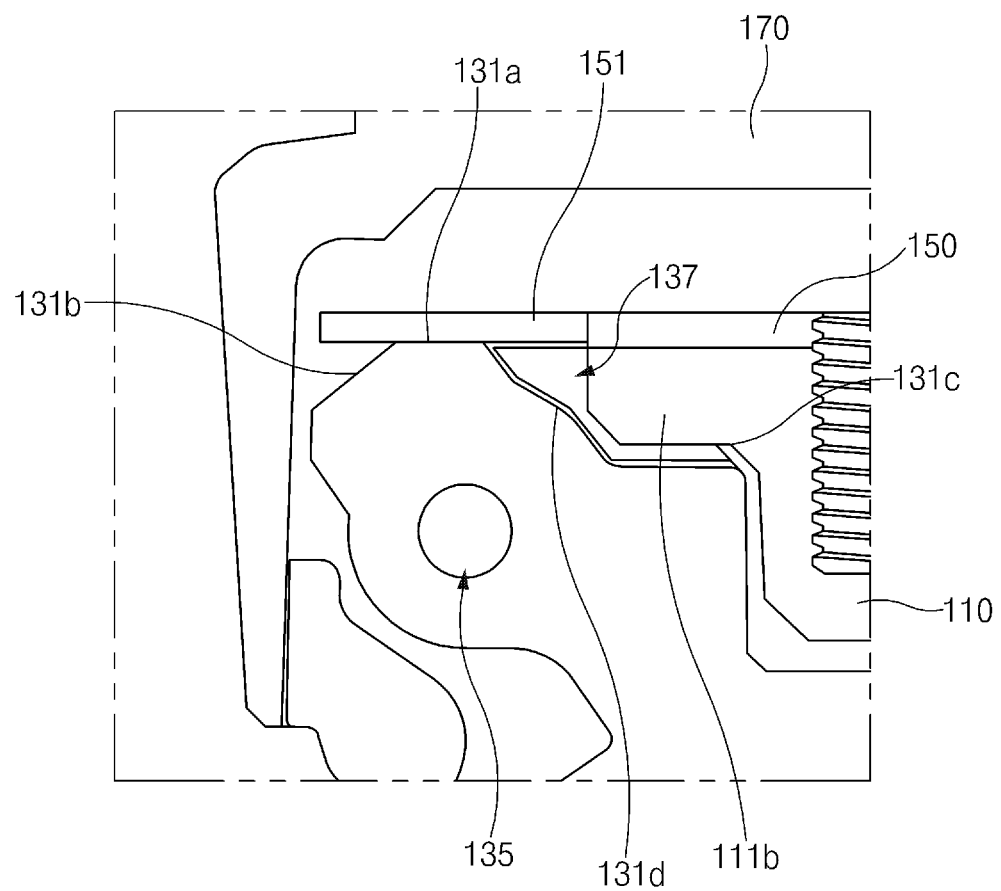
FIG. 3B is a longitudinal sectional view of FIG. 3A.

FIG. 3A is a perspective view illustrating an example shape of a contact member of a leg of the tripod according to an example embodiment of the present disclosure. FIG. 3B is a longitudinal sectional view of FIG. 3A.

Referring to FIGS. 3A and 3B, a contact member 131 may be arranged at an upper end of the leg 130 of the tripod 100. According to various embodiments, the contact member 131 may have a through-hole 135 that passes through opposite surfaces thereof. The through-hole 135 may have a diameter that is the same as or similar to the diameter of a rotation shaft 133 such that the rotation shaft 133 may be inserted through the through-hole 135.

According to various embodiments, an upper end of the contact member 131, which contacts the support member 150, may have a plurality of surfaces. According to an embodiment, an upper end of the contact member 131 may have a first surface 131a that defines a first angle with a longitudinal axis of the leg 130, and a second surface 131b that extends from the first surface 131a and defines a second angle with the first surface 131a. However, the present disclosure is not limited thereto. In some embodiments, at least one surface extends from the second surface 131*b* to define an angle that is different from an angle between the first surface 131*a* and the second surface 131*b*, with the first surface 131*a*.

According to various embodiments, an inclined surface 131*c* may be formed at an upper end of the contact member 131 on a side that is opposite to the second surface 131*b* with respect to the first surface 131*a*. The inclined surface 131*c* may face a side wall of the bracket 110, which has an opening 111, when the contact member 131 is inserted into the opening 111 arranged at a peripheral area of the bracket 110. According to various embodiments, a recess 137 may be formed at a portion of the first surface 131*a* and a portion of the inclined surface 131*c*. The recess 137 may be recessed to have a specific width and a specific depth such that a first protrusion 111*b* that protrudes from a portion of a side wall of the bracket 110, which has the opening 111, may be inserted into the recess 137 when the contact member 131 is inserted into the opening 111. When the contact member 131 is rotated about the rotation shaft 133, the first protrusion 111*b* may function as a stopper that restrains the leg 130 from being unfolded from the central axis of the bracket 110 to a specific angle or more. Further, a sliding surface 131*d* may be arranged such that the first protrusion 111*b* face the sliding surface 131*d* as through the first protrusion 111*b* is slid in the recess 137 when the contact member 131 is rotated about the rotation shaft 133. In some embodiments, the first protrusion 111*b* may be situated in the recess 137 while not contacting the sliding surface 131*d*.

Figure 4A:
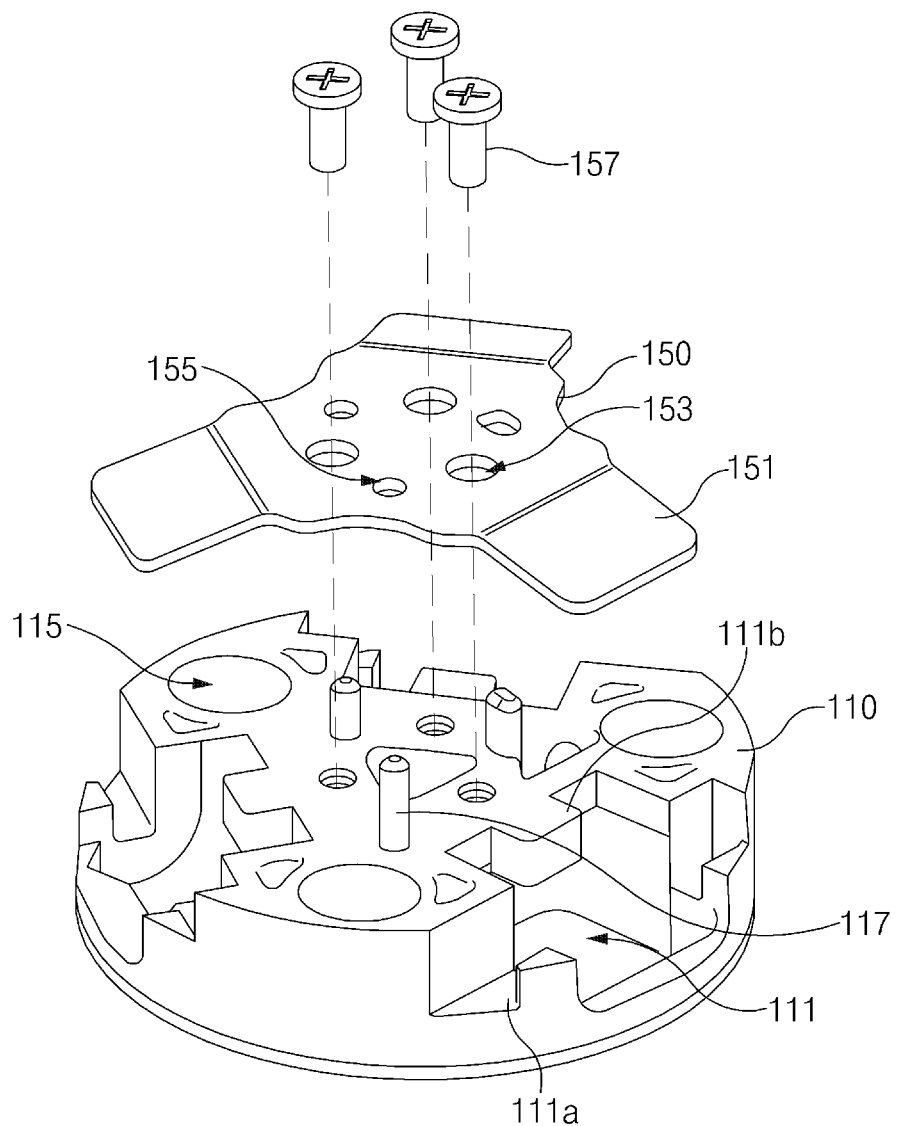
FIG. 4A is an exploded perspective view of a bracket and a support member of the tripod according to an example embodiment.
Figure 4B:
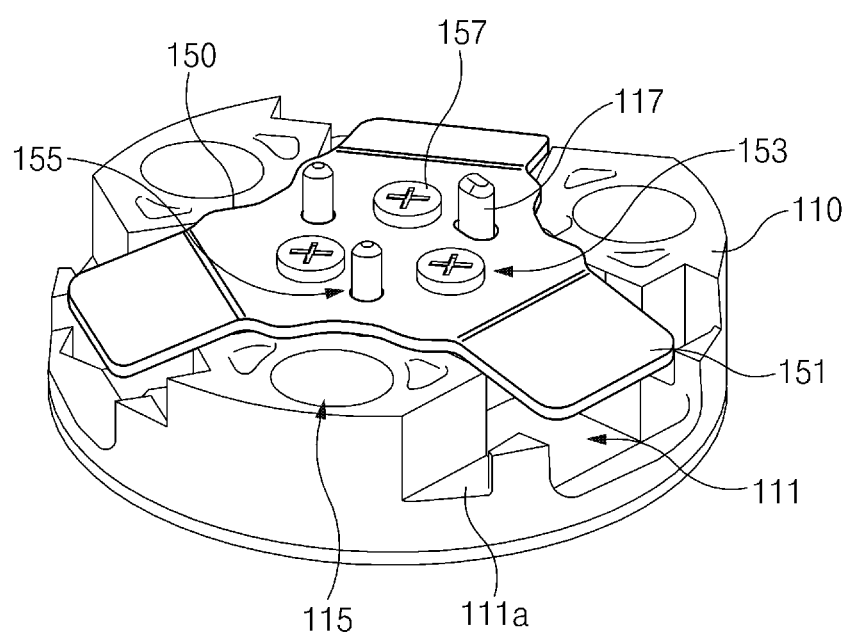
FIG. 4B is a perspective view of a coupled state of FIG. 4A.

FIG. 4A is an exploded perspective view of a bracket and a support member of the tripod according to an example embodiment of the present disclosure. FIG. 4B is a perspective view of a coupled state of FIG. 4A.

Referring to FIGS. 4A and 4B, the bracket 110 may be configured such that at least one opening 111 is provided at a peripheral area of the bracket 110 such that the contact member 131 of the leg 130 may be seated in the opening 111. Further, a recess 111*a* may be arranged at an area that is adjacent to the opening 111 such that the rotation shaft 133 may be seated in the groove 111*a*. According to an embodiment, if the contact member 131 is inserted into the opening 111 and the through-hole 135 formed in the contact member 131 is aligned with the groove 111*a*, the rotation shaft 133 may be inserted into the through-hole 135 along the groove 111*a* and may be seated in the bracket 110. According to various embodiments, the first protrusion 111*b* may protrude from a portion of a side wall of the bracket 110 having the opening 111.

According to various embodiments, at least one through-hole 115 that passes through the upper and lower surfaces of the bracket 110 may be arranged in the bracket 110 such that the screw member 113 may be inserted into the through-hole 115 for coupling with the cover member 170. Further, a second column-shaped protrusion 117 that protrudes from an upper surface of the bracket 110 may be formed in the bracket 110 such that at least one resilient member 151 that defines a portion of a periphery of the support member 150 is arranged in the contact member 131 exposed to the outside through the opening 111 when the support member 150 covers an upper surface of the bracket 110. According to various embodiments, if the second protrusion 117 is inserted into a second hole 155 arranged in the support member 150, the support member 150 may be seated in the bracket 110. Further, the support member 150 may be arranged such that the screw member 157 may pass through a portion of an upper surface of the bracket 110 through the first hole 153 when the support member 150 is fixed to the bracket 110. According to various embodiments, the shape of the second protrusion 117 may be the same as or similar to the shape of the second hole 155. For example, when the shape of an upper end of the second protrusion 117 and the shape of the second hole 155 are the same or similar and the second protrusion 117 is inserted into the second hole 155, the support member 150 may be fixed to the bracket 110 not to be rotated on the upper surface of the bracket 110. Further, the shape of the second protrusion 117 and the shape of the second hole 155 may be different. For example, the diameter (or at least one of a transverse length and a longitudinal length) of the second protrusion 117 may be smaller than the diameter (or at least one of a transverse length and a longitudinal length) of the second hole 155. In this case, the support member 150 may be moved or rotated on the upper surface of the bracket 110.

The support member 150 may include a central portion that covers a central area of an upper surface of the bracket 110 and at least one extending portion that extends from one side of the central portion. At least one second hole 155 may be arranged such that the second protrusion 117 of the bracket 110 may be inserted into the central portion of the support member 150. Further, at least one first hole 153, in which the screw member 157 may be inserted such that the support member 150 may be fixed to the bracket 110, may be arranged at the central portion of the support member 150. According to an embodiment, the support member 150 may be fixed to the bracket 110 by the screw member 157 that is inserted into the first hole 153 from an upper end of the support member 150 to a lower end of the bracket 110 to be screw-coupled to the first hole 153 while covering a portion of the upper surface of the bracket 110. The extending portion of the support member 150 may support the contact member 131 of the leg 130 exposed to the outside through the opening 111 of the bracket 110 while containing the contact member 131. According to an embodiment, the extending portion of the support member 150 may be formed of a resilient member 151 having a resilient force of a specific magnitude. Accordingly, the extending portion of the support member 150 may be deformed vertically by a resilient force of the resilient member 151.

Figure 5A:
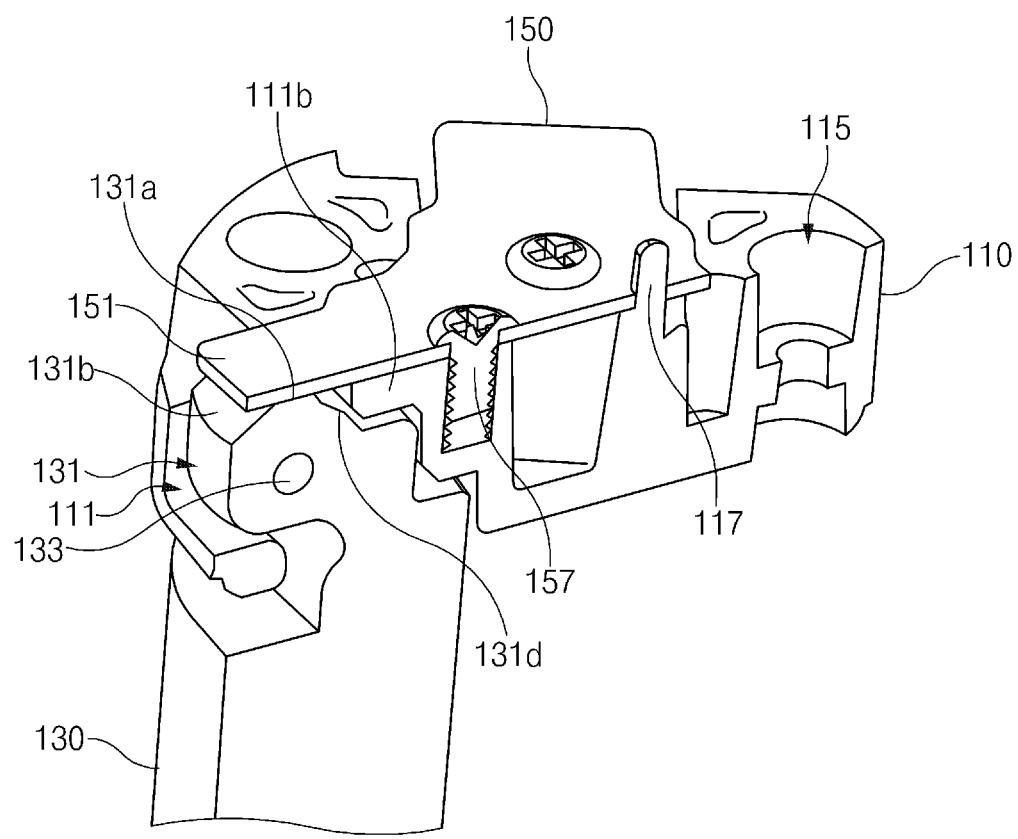
FIG. 5A is a sectional view of a leg, a bracket, and a support member of the tripod according to an example embodiment.
Figure 5B:
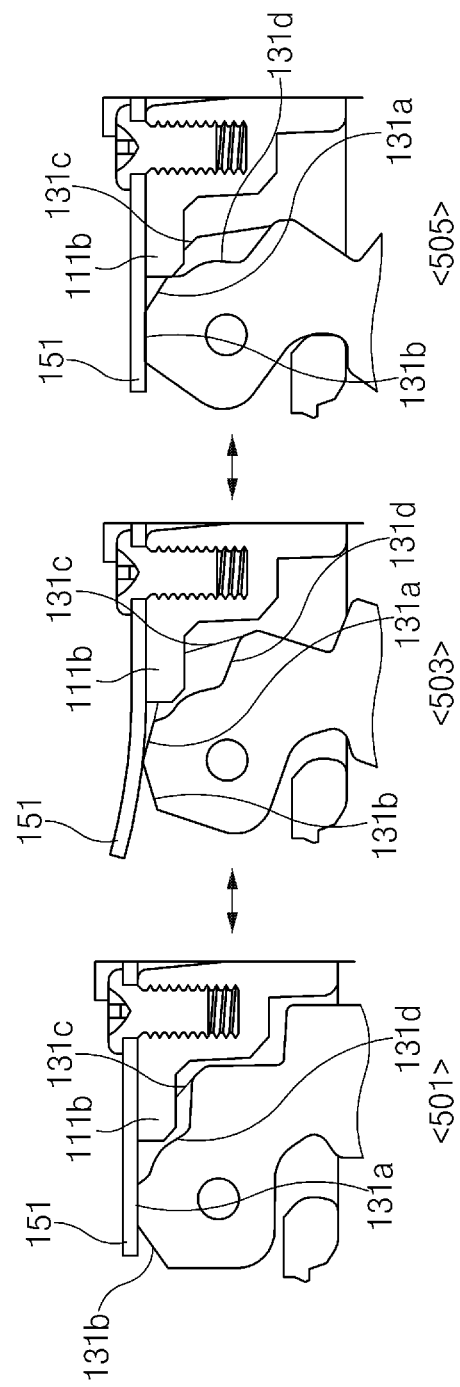
FIG. 5B is a partial sectional view of the leg, the bracket, and the support member of the tripod, illustrating a change of the states of the leg of the tripod according to an example embodiment.

FIG. 5A is a sectional view of a leg, a bracket, and a support member of the tripod according to an example embodiment of the present disclosure. FIG. 5B is a partial sectional view of the leg, the bracket, and the support member of the tripod, illustrating a change of the states of the leg of the tripod according to an example embodiment of the present disclosure.

Referring to FIGS. 5A and 5B, the contact member 131 of the leg 130 is inserted into the opening 111 formed in a peripheral area of the bracket 110 from a lower end to an upper end of the bracket 110 to be seated, and the rotation shaft 133 is inserted into the through-hole 135 that passes through the opposite surfaces of the contact member 131 such that the contact member 131 and the bracket 110 may be coupled to each other. Further, the second protrusion 117 that protrudes from a portion of the upper surface of the bracket 110 is inserted into the second hole 155 arranged in the support member 150 such that the support member 150 is fixed not to be rotated, and the support member 150 may be fixed to the bracket 110 by inserting the screw member 157 into the first hole 153 arranged in the support member 150 and screw-coupling the screw member 157 to the bracket 110.

The support member 150 may be fixed as long as a load is not applied to the contact member 131 to apply an external pressure of a specific magnitude to the contact member 131.

Further, the support member 150 includes a resilient member 151 having a resilient force of a specific magnitude in an area that contacts the contact member 131, and may be applied such that the state of the leg 130 may be changed if an external pressure of a specific magnitude is applied to the contact member 131.

An upper end of the contact member 131, which contacts the support member 150, may have a plurality of surfaces. In the drawing, an upper end of the contact member 131 may have a first surface 131a that defines a first angle with a longitudinal axis of the leg 130, and a second surface 131b that extends from the first surface 131a and defines a second angle with the first surface 131a.

According to various embodiments, if the first surface 131a of the contact member 131 contacts the resilient member 151 as in the first state 501, the longitudinal axis of the leg 130 may be situated in parallel to the central axis of the bracket 110. If the legs 130 of the tripod 100 are situated in parallel to the central axis of the bracket 110, the side surfaces of the legs 130 are connected to each other to form a folding state of a single rod shape.

If a force that pulls the leg 130 to the outside of the leg 130 is applied in a first state 501, a line at which the first surface 131a and the second surface 131b of the contact member 131 lifts the resilient member 151 upwards as in a second state 503. In this case, the support member 150 may increase a load that is applied to the contact member 131. Further, an additionally pulling force is further applied in the second state 503, the second surface 131b of the contact member 131 may contact the resilient member 151 as in a third state 505. When the second state 503 is converted to the third state 505, the resilient member 151 may be restored to the original state by a resilient force. When the second surface 131b of the contact member 131 contacts the resilient member 151, the leg 130 may be converted into an unfolding state in which the leg 130 defines a specific angle with the central axis of the bracket 110. When the leg 130 is in an unfolding state, the tripod 100b may be held on the ground surface.

Figure 6A:
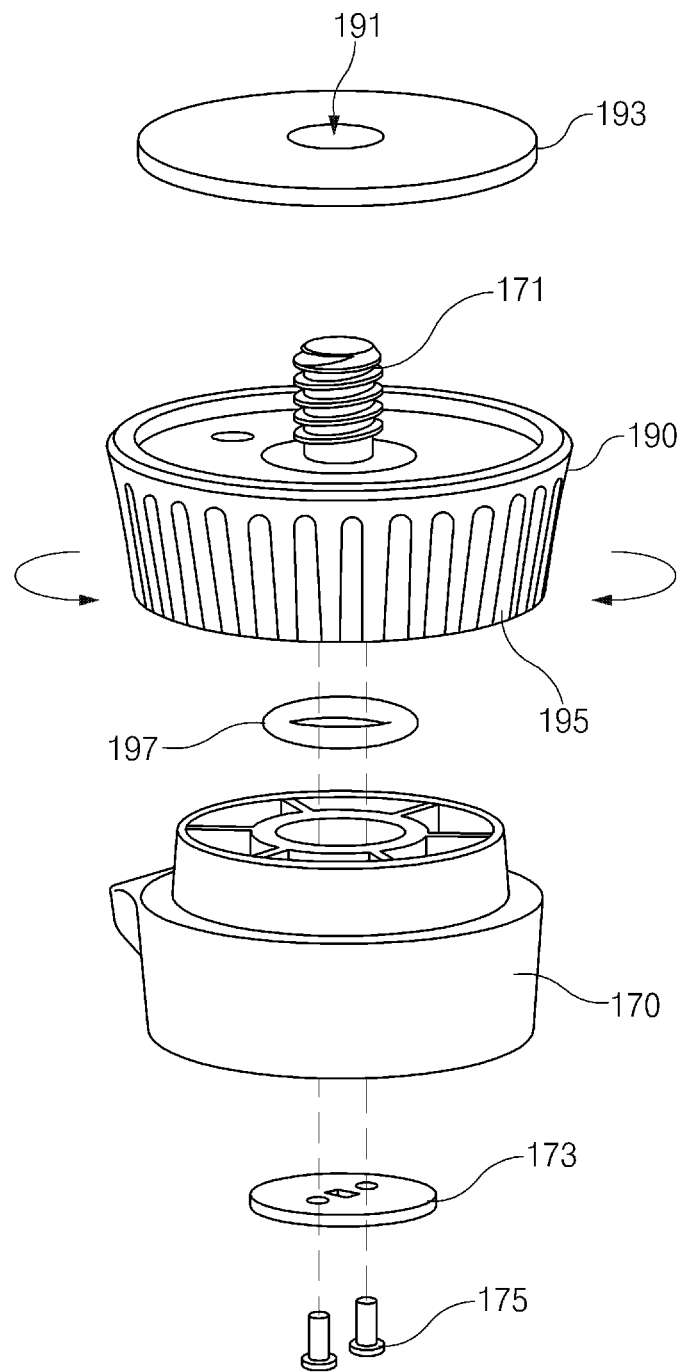
FIG. 6A is an exploded perspective view of a cover member and a rotation member of the tripod according to an example embodiment.
Figure 6B:
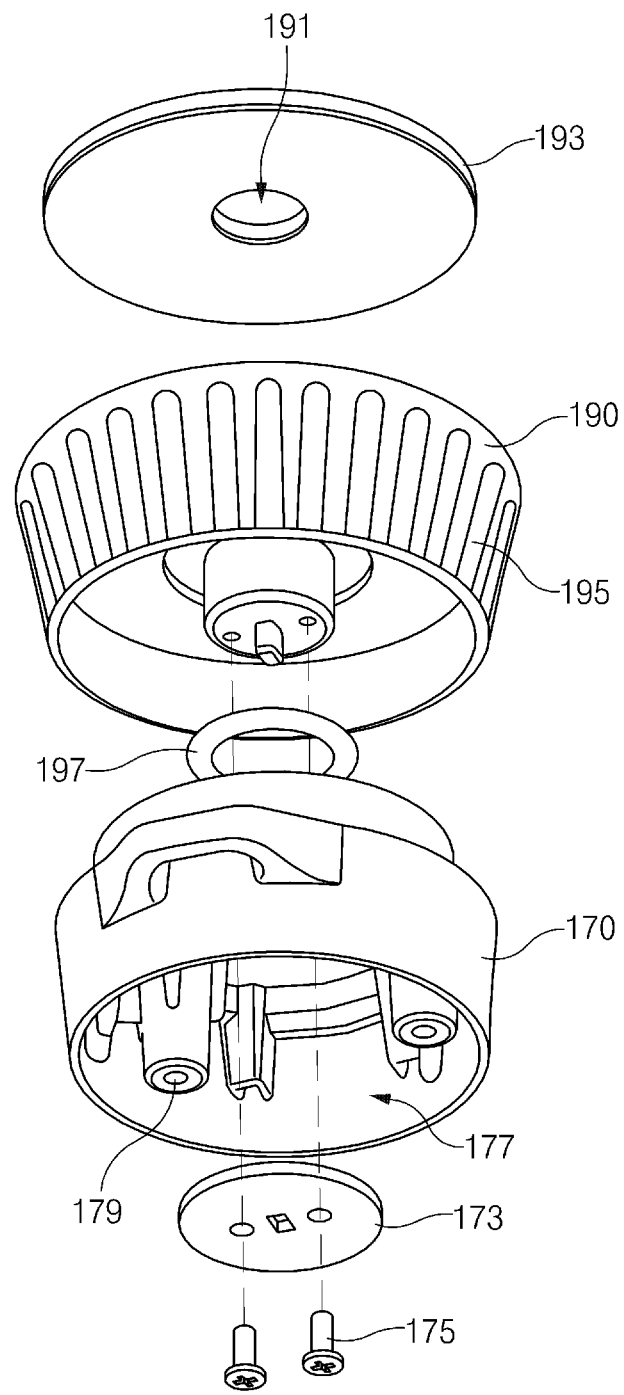
FIG. 6B is an exploded perspective view of FIG. 6A when viewed from the lower side.
Figure 6C:
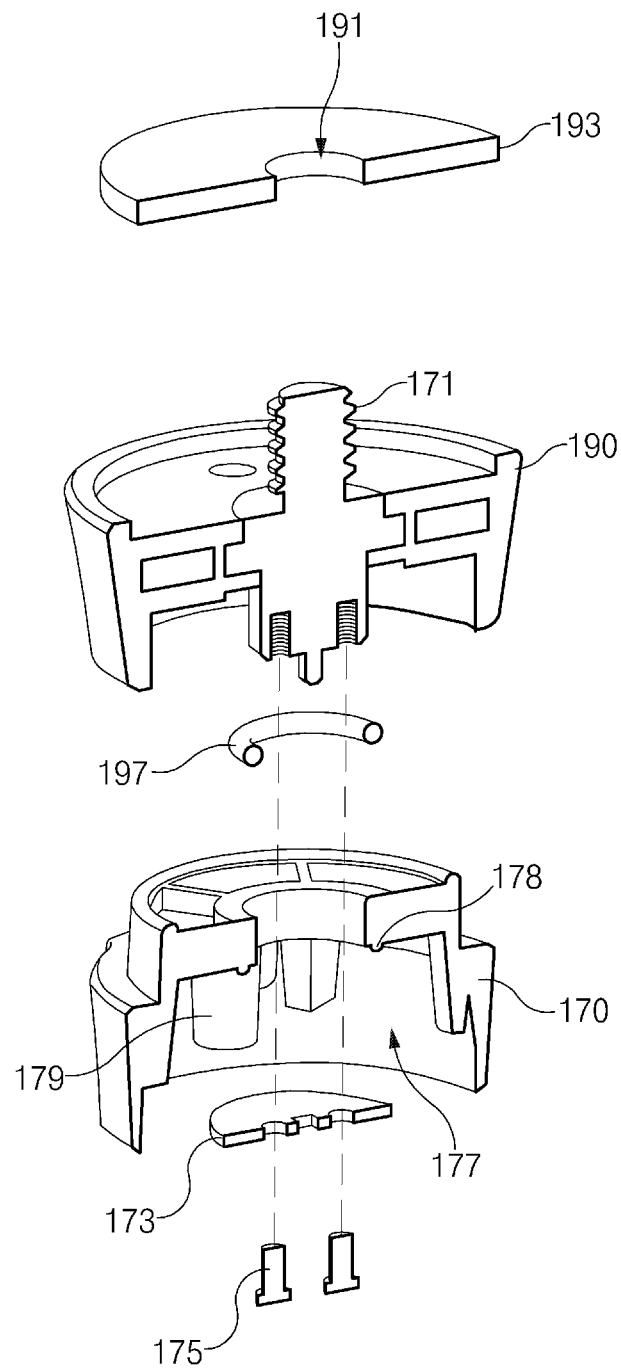
FIG. 6C is a sectional view of FIG. 6A.
Figure 6D:
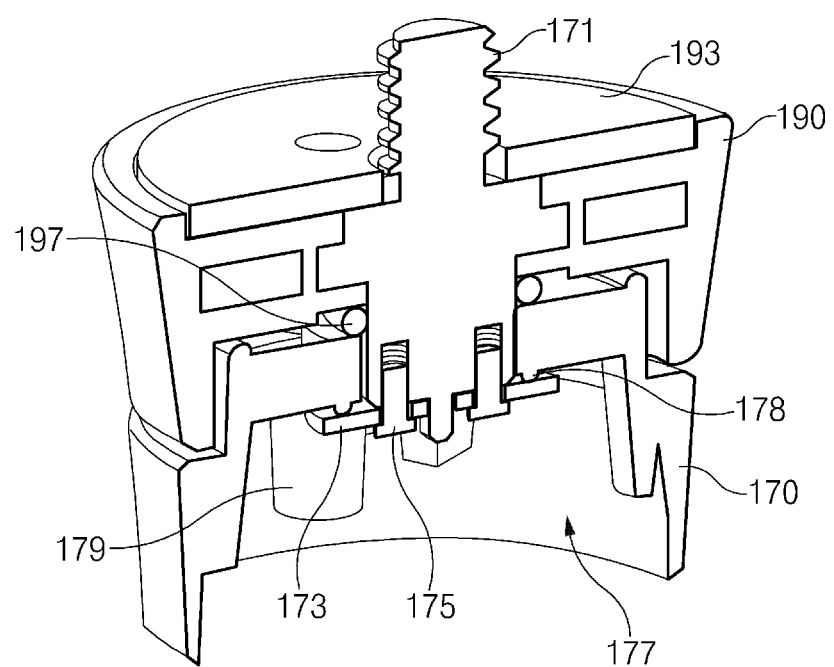
FIG. 6D is a cross-sectional view of a coupled state of FIG. 6C.

FIG. 6A is an exploded perspective view of a cover member and a rotation member of the tripod according to an example embodiment of the present disclosure. FIG. 6B is an exploded perspective view of FIG. 6A when viewed from the lower side. FIG. 6C is a sectional view of FIG. 6A. FIG. 6D is a perspective view of a coupled state of FIG. 6C.

Referring to FIGS. 6A to 6D, a lower end of the cover member 170 may be opened such that the cover member 170 may cover the upper surface and a portion of the side surface of the bracket 110, and a cavity 177 may be arranged inside the cover member 170. According to various embodiments, the cover member 170 may have a shape that is the same as or similar to the shape of the bracket 110. For example, the cover member 170 may be cylindrical. A column-shaped coupling part 179 that extends from an upper surface of the cover member 170 to protrude downwards may be arranged in the cavity 177 arranged inside the cover member 170. A hole may be arranged in the coupling part 179 such that the screw member 113 may be screw-coupling to the bracket 110 from a lower end towards an upper end of the bracket 110, and a screw groove may be formed on an inner peripheral surface of the hole.

The rotation member 190 may be coupled to an upper end of the cover member 170. According to an embodiment, the rotation member 190 may be coupled to the cover member 170 to cover an upper surface and a portion of a side surface of the cover member 170. According to various embodiments, the rotation member 190 may be fixed to the cover member 170 by the screw member 175 that is coupled to the cover member 170 from a lower end to an upper end of the cover member 170. According to an embodiment, at least one screw hole may be arranged such that the screw member 175 may be inserted into and coupled to a lower end of the connection member 171 provided in the rotation member 190.

According to various embodiments, the rotation member 190 may include a connection member 171. According to an embodiment, the connection member 171 may be situated at a central portion of an upper end of the rotation member 190, and may protrude from the upper surface of the rotation member 190. According to various embodiments, a lower end of the connection member 171 may protrude from a lower surface of the rotation member 190, and the cavity 177 formed in the cover member 170 may be exposed through the opening formed at an upper end of the cover member 170. According to various embodiments, the connection member 171 may include a screw thread.

According to various embodiments, when the rotation member 190 is coupled to the cover member 170 by the screw member 175, it may be coupled together with a resistance support member 173 (for example, a washer). According to an embodiment, the resistance support member 173 may be inserted into the cavity 177 of the cover member 170 to be attached to and coupled to a lower end of the connection member 171 provided in the rotation member 190. According to various embodiments, the resistance support member 173 may have a disk shape, and may include at least one through-hole such that the screw member 175 may be inserted into the through-hole. According to various embodiments, if the resistance support member 173 may be attached to a lower end of the connection member 171 and is fixed by the screw member 175, a portion of the cover member 170 may contact a portion of an upper surface of the resistance support member 173. According to an embodiment, at least one boss 178 protruding from an upper end of the cover member 170 may be arranged at a portion of an inner surface of the cover member 170, at which a cavity 177 is formed, and at least one boss 178 may contact a portion of the upper surface of the resistance support member 173. Accordingly, the resistance support member 173 may prevent and/or reduce deviation of the connection member 171 from the cover member 170. Further, when the rotation member 190 is rotated, a frictional force may be generated at a point at which the resistance support member 173 fixed to the rotation member 190 and the boss 178 contact each other. As long as an external pressure of a specific magnitude or more is not applied to the rotation member 190, the rotation member 190 may not be rotated due to the frictional force.

According to various embodiments, when the rotation member 190 is coupled to the cover member 170, the ring member 197 may be coupled together. The ring member 197 may have a ring shape, and may be formed of a rubber material having a resilient force of a specific magnitude. According to an embodiment, the ring member 197 may surround the connection member 171 provided in the rotation member 190, and may be situated between the cover member 170 and the rotation member 190. For example, the connection member 171 may be inserted from an upper end to a lower end of the ring member 197, the ring member 197 inserted into the connection member 171 may be seated on an upper end of the cover member 170. Accordingly, a frictional force may be generated in the rotation member 190 and the cover member 170 in contact with upper and lower ends of the ring member 187 when the rotation member 190 is rotated. As long as an external pressure of a specific magnitude or more is not applied to the rotation member 190, the rotation member 190 may not be rotated due to the frictional force.

According to various embodiments, the rotation member 190 may have a shape that is the same as or similar to the shape of the cover member 170. For example, the rotation member 190 may be cylindrical. According to an embodiment, grooves 195 may be formed at a specific gap on an outer surface of the rotation member 190. The grooves 195 may prevent and/or reduce sliding of the rotation member 190 when the user grips the rotation member 190.

According to various embodiments, an upper surface of the rotation member 190 may be recessed. Further, the cover 193 may be seated in an area in which a portion of the upper surface of the rotation member 190 is recessed. A through-hole 191 may be arranged at a central portion of the cover 193 such that the connection member 171 that protrudes from the upper surface of the rotation member 190 may protrude to the outside when a portion of the upper surface of the rotation member 190 is covered. Further, the cover 193 may function as a support when a photographing apparatus or a holder of the photographing apparatus is coupled to the connection member 171, and a flexible material, such as a rubber, may be arranged such that the photographing apparatus or the holder may not be damaged while the rotation member 190 is rotated. According to various embodiments, the cover 193 may have a disk shape, and a portion of an upper surface of the rotation member 190 may have a thickness that is larger than the recessed depth by a specific size. According to various embodiments, the cover 193 may be integrally formed with the rotation member 190. For example, the cover 193 may define a portion of the upper surface of the rotation member 190.

Figure 7:
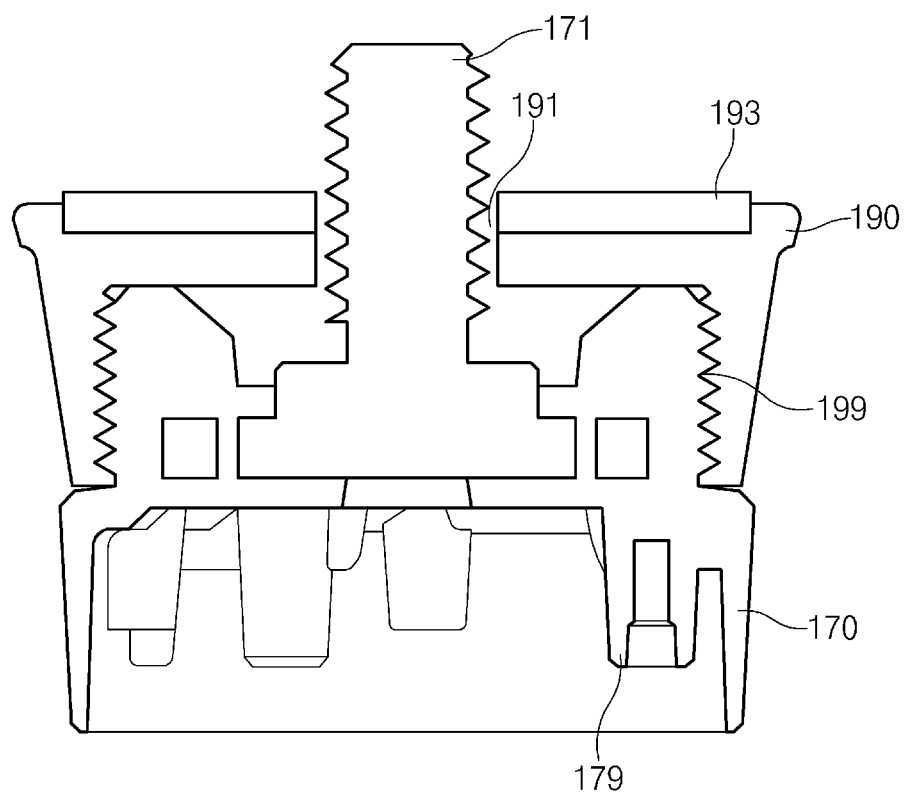
FIG. 7 is a cross-sectional view of a cover member and a rotation member of a tripod having another shape according to an example embodiment.

FIG. 7 is a cross-sectional view of a cover member and a rotation member of a tripod having another shape according to an example embodiment of the present disclosure. According to various embodiments, the cover member 170 and the rotation member 190 of the tripod 100 may have shapes other than the shapes described with reference to FIGS. 6A to 6D.

Referring to FIG. 7, the connection member 171 may be provided in the cover member 170, instead of in the rotation member 190. According to an embodiment, the connection member 171 may be situated at a central portion of an upper end of the cover member 170, and may protrude from the upper surface of the cover member 170. In this case, a through-hole 191 may be arranged in the rotation member 190 coupled to an upper end of the cover member 170 such that the connection member 171 may be exposed to the outside. The drawing illustrates a state in which the through-hole 191 is formed at a central portion of the rotation member 190 and at a central portion of the cover 193 that covers a portion of the upper surface of the rotation member 190.

According to various embodiments, the rotation member 190 may be rotatably coupled to the cover member 170. According to an embodiment, a screw groove formed on an inner surface of the rotation member 190 may be rotatably coupled to the screw thread 199 formed on an outer surface of the cover member 170. According to various embodiments, a pitch of the screw thread 199 formed on the outer surface of the cover member 170 may be different from a pitch of the screw thread formed in the connection member 171 provided in the cover member 170. Accordingly, a rotation of the photographing apparatus coupled to the connection member or the holder that fixes the photographing apparatus during rotation of the rotation member 190 may have a rotation rate that is different from that of a rotation of the rotation member 190 on the cover member 170.

Figure 8A:
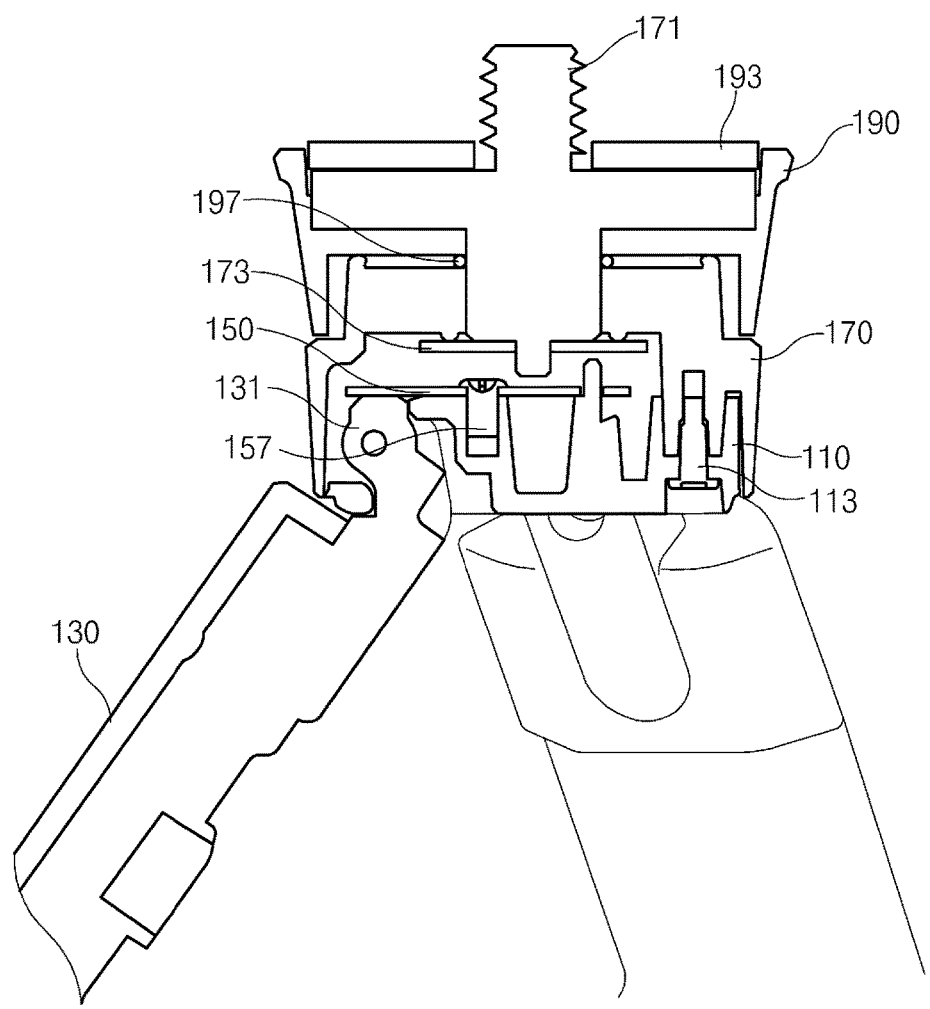
FIG. 8A is a sectional view taken along line A-A' of FIG. 2 according to an example embodiment.
Figure 8B:
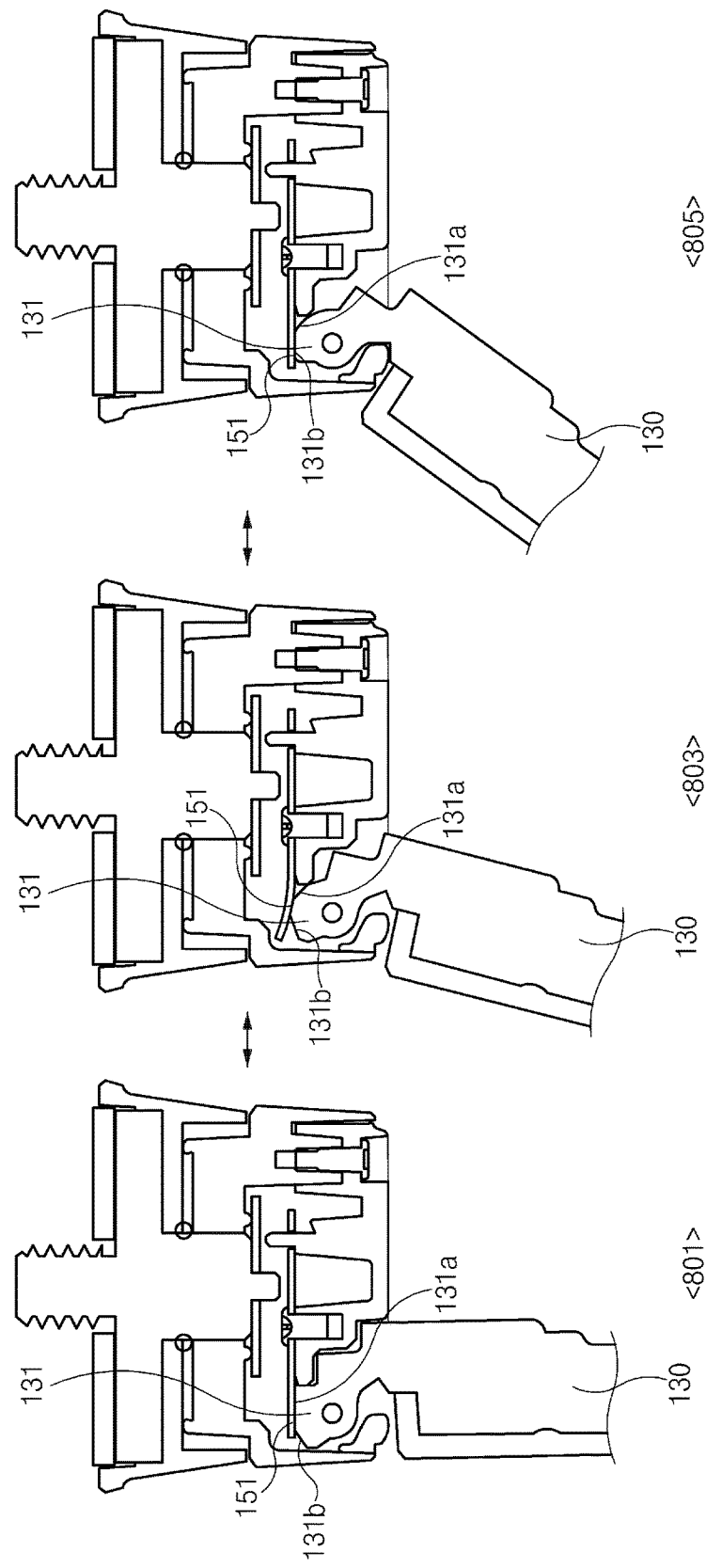
FIG. 8B is a sectional view taken along line A-A' of FIG. 2 illustrating a change of the states of the legs of the tripod according to an example embodiment.

FIG. 8A is a sectional view taken along line A-A' of FIG. 2 according to an example embodiment of the present disclosure. FIG. 8B is a sectional view taken along line A-A' of FIG. 2 based on a change of the states of the legs of the tripod according to an example embodiment of the present disclosure.

Referring to FIGS. 8A and 8B, the rotation member 190, a portion of the upper surface of which is covered by the cover 193 may include a connection member 171. Further, while the ring member 197 is mounted from a lower end to an upper end of the connection member 171, the rotation member 190 may cover an upper surface and a portion of a side surface of the cover member 170. In this case, an upper end of the ring member 197 may contact a lower end of the rotation member 190 while the ring member 197 surrounds a side surface of a lower end of the connection member 171, and a lower end of the ring member 197 may contact an upper end of the cover member 170. The resistance support member 173 may be inserted into the cavity 177 formed at a lower end of the cover member 170 while the rotation member 190 covers the cover member 170, and the resistance connection member 171 may be screw-coupled to the connection member 171 by a screw member 175 such that the resistance support member 173 may be attached to a lower end of the connection member 171. In this case, a boss 178 that protrudes from an upper end of the cover member 170 at a portion of an inner surface of the cover member 170, in which the cavity 177 is formed, may contact a portion of the upper surface of the resistance support member 173.

The legs 130 of the tripod 100 may be seated when the contact members 131 arranged at the upper ends of the legs 130 are inserted from the lower ends to the upper ends of the openings 111 formed at the peripheral areas of the bracket 110. Further, the rotation shaft 133 may be inserted into the through-hole 135 that extends from one side surface to an opposite side surface of the contact member 131 and may be seated in the groove 111a arranged adjacent to the opening 111 of the bracket 110.

The support member 150 is covered on an upper surface of the bracket 110, in which the leg 130 is seated, and the support member 150 may be fixed to the bracket 110 as the screw member 157 is screw-coupled to the support member 150 from an upper end to a lower end of the support member 150. In this case, the resilient member 151 provided in the support member 150 may contact at least one surface formed at the upper end of the contact member 131. The bracket 110, to which the support member 150 is fixed, may be coupled to the cover member 170 coupled to the rotation member 190, through the screw member 113. According to an embodiment, the screw member 113 that is screw-coupled to the bracket 110 from a lower end to an upper end of the bracket 110 may fix the bracket 110 and the cover member 170.

In this case, the resilient member 151 provided in the support member 150 may apply a load to at least one surface formed at the upper end of the contact member 131. Accordingly, if the first surface 131a formed at the upper end of the contact member 131 contacts the resilient member 151 as in the first state 801, the leg 130 may be situated in parallel to the central axis of the bracket 110. Further, if a force of a specific magnitude or more is applied to the outer surface of the leg 130 as in the second state 803, a line at which the first surface 131a and the second surface 131b are connected to each other may lift the resilient member 151 upwards. In this case, if the resilient member 151 is moved upwards, a load that is applied to the contact member 131 by the resilient member 151 may increase. If an additional external pressure is applied to the outer surface of the leg 130 while the magnitude of the load is maximal, the magnitude of the load may gradually decrease while the resilient member 151 is moved downwards by a resilient force. Further, if the second surface 131b contact the resilient member 151 as in a third state 805, the resilient member 151 is restored to the original state and the leg 130 may defines a specific angle with the central axis of the bracket 110. The tripod 100 may be held on the ground surface while all the legs 130 are unfolded.

Figure 9:
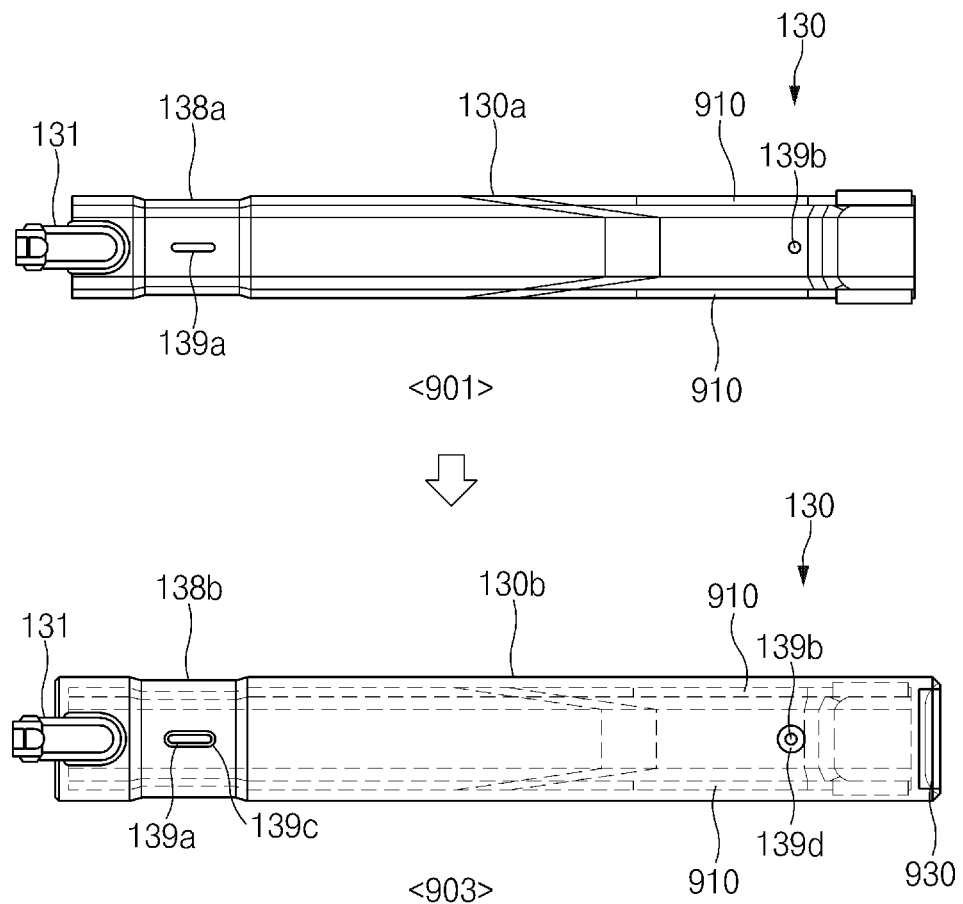
FIG. 9 is a diagram illustrating a leg of a tripod according to an example embodiment.

FIG. 9 is a diagram illustrating a leg of a tripod according to an example embodiment of the present disclosure.

Referring to FIG. 9, the leg 130 of the tripod 100 may be configured such that a longitudinal length (a transverse direction of the drawing) thereof is larger than a transverse length (a longitudinal direction of the drawing) thereof. The drawing is a view that is obtained by viewing an inner surface of the leg 130. Although not illustrated, according to various embodiments, an outer surface of the leg 130 may define a curved surface that is curved about the longitudinal axis of the leg 130. For example, opposite peripheries of the outer surface of the leg 130 may have the smallest thickness, and the central portion thereof may have the largest thickness. According to various embodiments, the inner surface of the leg 130 may be flat.

A contact member 131 may be arranged at an upper end of the leg 130. According to various embodiments, a recessed part 138b may be formed at a lower end of an area in which the contact member 131 is arranged. The recessed part 138b is an area that is recessed to have a specific width and a specific depth, and when the adjacent legs 130 are folded and coupled to each other, an empty space may be formed. According to various embodiments, the empty space may be utilized as an area to which an external device may be coupled, or may be utilized as a space into which a part (for example, a finger) of the body of a user such that a force may be applied to the outside of the leg 130 when the folded leg 130 is unfolded.

According to various embodiments, at least one magnetic member 910 may be coupled to a peripheral area of a lower end of the leg 130. The magnetic members 910 may function to fix the legs 130 by using a magnetic force when the adjacent legs 130 are coupled to each other. According to various embodiments, one magnetic member may be arranged at each of opposite peripheries of a lower end of the leg 130. According to an embodiment, the magnetic members 910 arranged at the opposite peripheries of the lower end of the leg 130 may have different polarities.

According to various embodiments, the leg 130 may be manufactured through at least one insert injection-molding process to have strength of a predetermined magnitude or more. The illustrated drawing illustrates a state in which the leg 130 is manufactured through two insert injection-molding processes. According to an embodiment, as in a first state 901, a body 130a of the leg 130 may be manufactured through a first insertion injection-molding process. The body 130a may include a contact member 131 at an upper end thereof, and a recessed part 138a may be formed at a lower end of the contact member 131. According to various embodiments, during a second insert injection-molding process, at least one alignment hole may be arranged on an inner surface of the body 130a such that the body 130a may be arranged in and fixed to a mold or the like. The drawing illustrates a state in which a first alignment hole 139a is formed in the recessed part 138a and a second alignment hole 139b is formed at a lower end of an inner surface of the body 130a.

According to various embodiments, if the body 130a is manufactured, at least one magnetic member 910 may be coupled to a peripheral area of the body 130a. Further, as in a second state 903, the body 130a, to which the magnetic member 910 is coupled, may be surrounded by an external appearance part 130b through a second insert injection-molding process. The external appearance part 130b may be formed such that the contact member 131 is exposed to the outside, and may have the same or similar shape according to the shape of the body 130a. For example, the external appearance part 130b may have a recessed part 138b at a lower end of the contact member 131 similarly to the body 130a. According to various embodiments, the external appearance part 130b may include a stopper 139c that is inserted into the first alignment hole 139a to protrude from the recessed part 138b by a specific height. According to an embodiment, the stopper 139c may be fixed to the first alignment hole 139a by a bonding material while being inserted into the first alignment hole 139a. According to various embodiments, the external appearance part 130b may include a first anti-wear member 139d that is inserted into the second alignment hole 139b to cover the second alignment hole 139b or prevents and/or reduces wear of the second alignment hole 139b. Further, the externa appearance part 130b may include a second anti-wear member 930 that prevents and/or reduces wear of a lower end thereof, which contacts the ground surface. According to an embodiment, the second anti-wear member 930 may be formed of a rubber, and may give a stable feeling when the tripod 100 is held on the ground surface.

According to various embodiments, the body 130a may be formed of stainless steel, and the external appearance part 130b may be formed of plastic (for example, polycarbonate (PC)). However, the materials of the body 130a and the external appearance part 130b are not limited thereto. According to various embodiments, the body 130a and the external appearance part 130b may be formed of the same material. Further, the leg 130 of the tripod 100 may not employ the external appearance part 130b and may employ only the body 130a. In this case, at least one magnetic member 910 may be coupled to a peripheral area of the body 130a, and at least one of the stopper 139c that is inserted into the first alignment hole 139a to protrude from the recessed part 138a by a specific height, the first anti-wear member 139d that is inserted into the second alignment hole 139b to cover the second alignment hole 139b or prevent and/or reduce wear of the second alignment hole 139d, and the second anti-wear member 930 that prevents and/or reduces wear of a lower end of the body 130a, which contacts the ground surface may be arranged in the body 130a.

Figure 10:
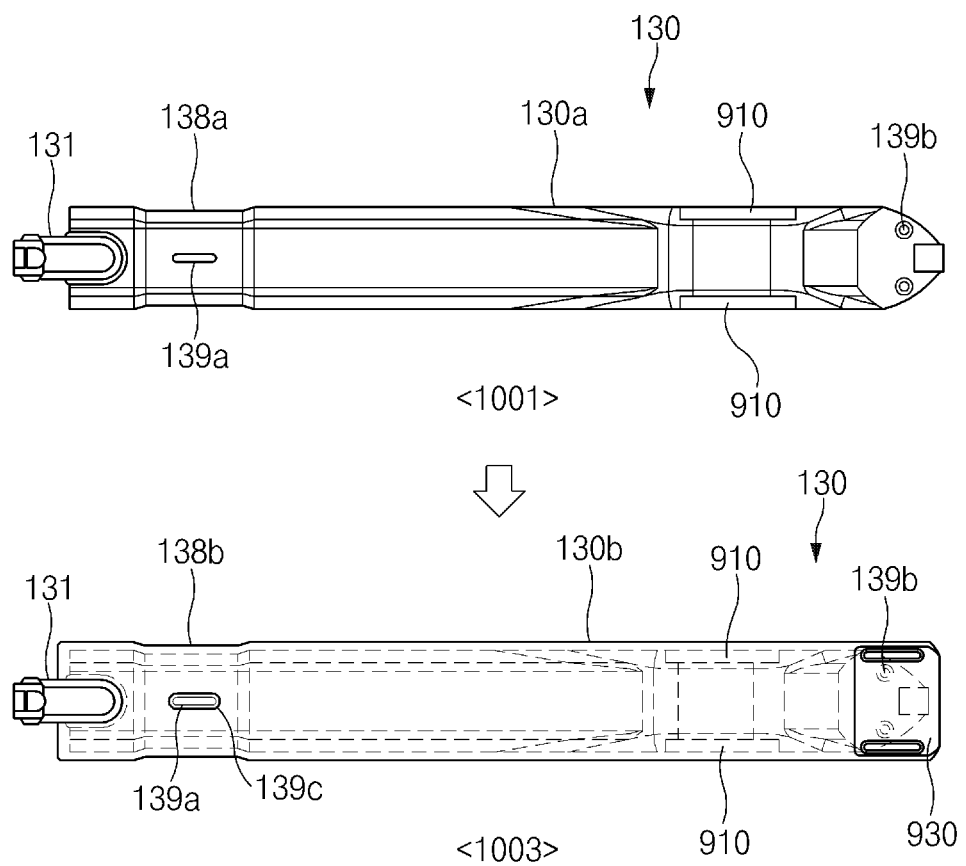
FIG. 10 is a diagram illustrating a leg of a tripod having another shape according to an example embodiment.

FIG. 10 is a diagram illustrating a leg of a tripod having another shape according to an example embodiment of the present disclosure. According to various embodiments, the leg 130 of the tripod 100 may have a shape that is different from the shape of FIG. 9.

Referring to FIG. 10, a lower end of the body 130a of the leg 130 of the tripod 100 may have a curved surface. Further, a body 130a may have a first alignment hole 139a in the recessed part 138a, and a plurality of second alignment holes 139b may be formed on an inner surface of a lower end of the body 130a. The drawing illustrates a state in which second alignment holes 139b are formed adjacent to opposite peripheries of the inner surface of the lower end of the body 130a, respectively.

According to various embodiments, as in a first state 1001, a magnetic member 910 is coupled to a peripheral area of the body 130*a*, and as in a second state 1003, the body 130*a* may be surrounded by the external appearance part 130*b*. According to various embodiments, the external appearance 130*b* may be formed such that the contact member 131 and the first alignment hole 139*a* is exposed to the outside, and the second alignment holes 139*b* are covered. For example, during the second insert injection-molding process, the body 130*a* may be fixed to a mold or the like by using only the first alignment hole 139*a*. Accordingly, the external appearance part 130*b* may include the stopper 139*c* that is inserted into the first alignment hole 139*a* to protrude from the recessed part 138*b* by a specific height, and the first anti-wear member 139*d* may be omitted.

According to various embodiments, the anti-wear member 930 may be arranged at a lower end of the external appearance part 130*b* such that the lower end of the external appearance part 130*b* is prevented from contacting the ground surface to be worn. According to an embodiment, the second anti-wear member 930 may be formed of a rubber. According to various embodiments, the second anti-wear member 930 may have at least one protrusion on an inner surface of the external appearance part 130*b*. The drawing illustrates a state in which protrusions are formed in opposite peripheral areas of an inner surface of the second anti-wear member 930.

According to various embodiments, when the body 130*a* is surrounded by the external appearance part 130*b*, all of the first alignment hole 139*a* and the second alignment holes 139*b* may be exposed to the outside. In this case, the second anti-wear member 930 may be coupled to cover the second alignment holes 139*b* such that the second alignment holes 139*b* are not exposed to the outside.

Figure 11A:
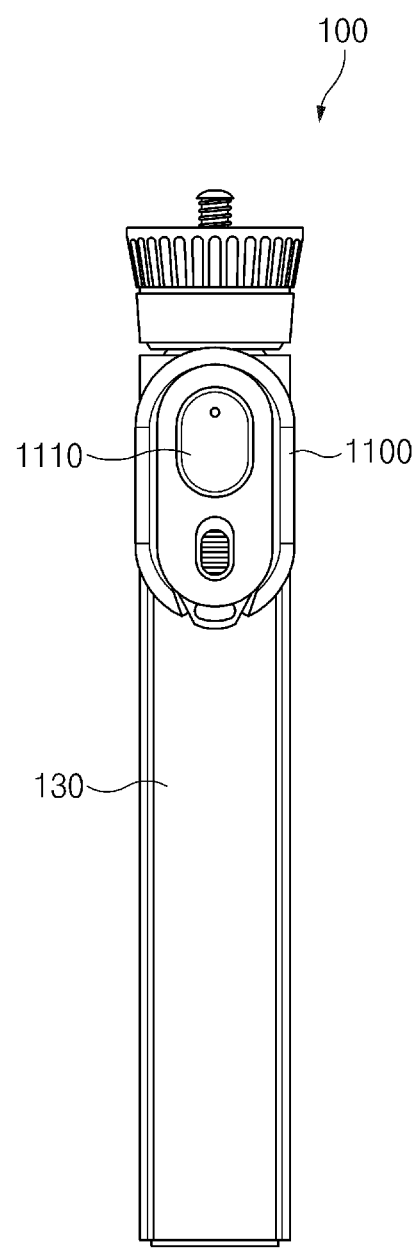
FIG. 11A is a diagram illustrating a tripod, to which an external device is coupled, according to an example embodiment.
Figure 11B:
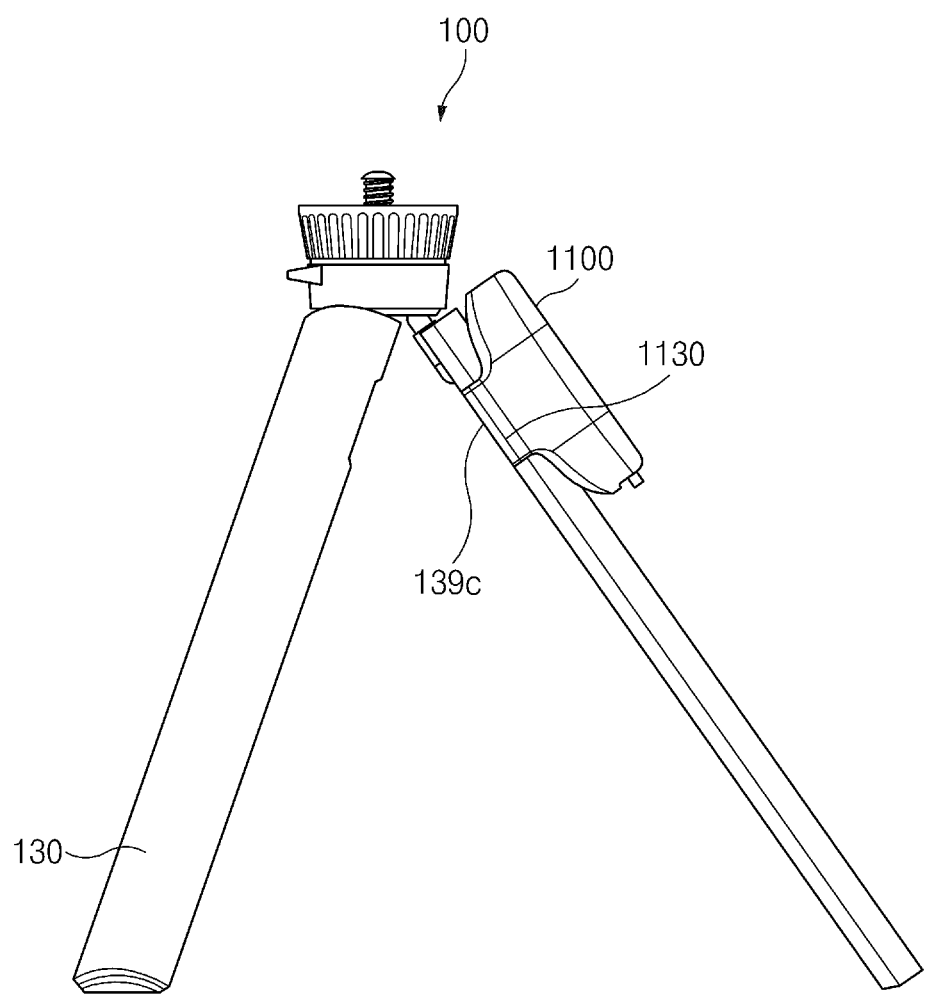
FIG. 11B is a diagram illustrating an unfolding state of legs of a tripod, to which an external device is coupled, according to an example embodiment.
Figure 11C:
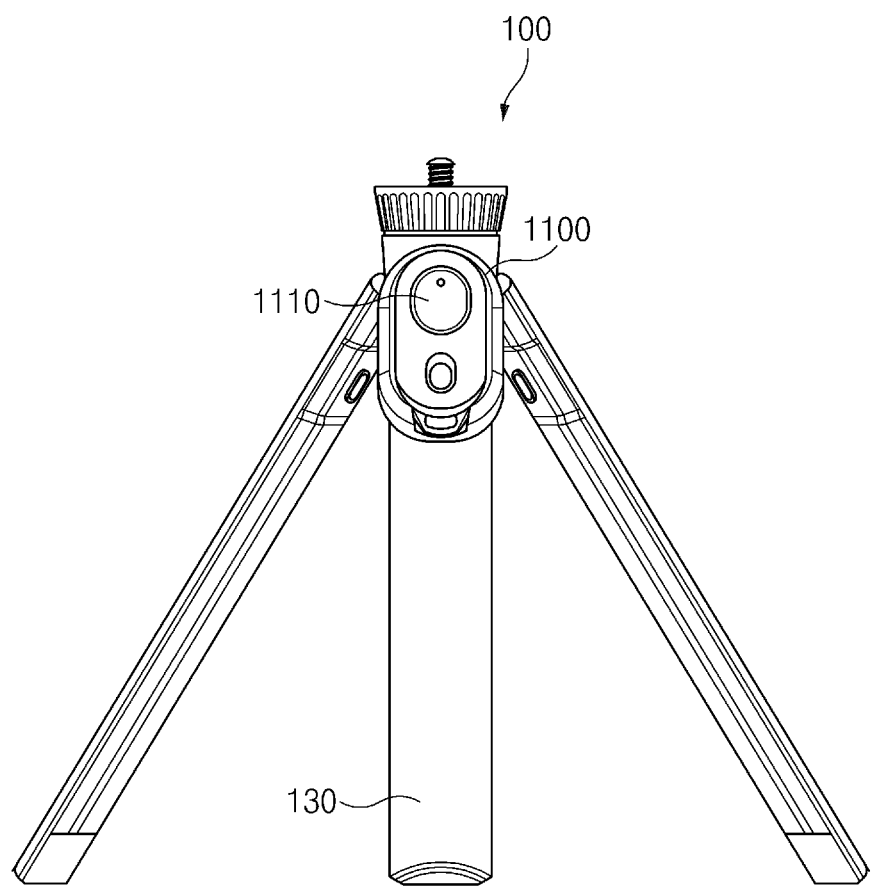
FIG. 11C is a side view of FIG. 11B.

FIG. 11A is a diagram illustrating a tripod, to which an external device is coupled, according to an example embodiment of the present disclosure. FIG. 11B is a view illustrating an unfolding state of legs of a tripod, to which an external device is coupled, according to an example embodiment of the present disclosure. FIG. 11C is a side view of FIG. 11B.

Referring to FIGS. 11A to 11C, an external device 1100 may be coupled to a leg 130 of the tripod 100. According to various embodiments, the external device 1100 may be connected to a photographing apparatus through wired or wireless communication, based on a communication module provided in the external device 1100. The wireless communication may include, for example, and without limitation, a cellular communication protocol, and, for example, may use at least one of long-term evolution (LTE), LTE-advanced (ATE-A), code division multiple access (CDMA), wideband CDMA (WCDMA), a universal mobile telecommunications system (UMTS), wireless broadband (WiBro), or a global system for mobile communications (GSM). Furthermore, the wireless communication, for example, may include a short range communication. The short range communication may include at least one of wireless fidelity (Wi-Fi), Bluetooth, near field communication (NFC), magnetic stripe transmission (MST), or GNSS.

An MST may generate a pulse according to transmission data by using an electromagnetic signal, and the pulse may generate a magnetic field signal. The external device 1100 may transmit the magnetic field signal to a point of sales (POS), detect the magnetic field signal by using an MST reader, and restore the data by converting the detected magnetic signal into an electrical signal.

The GNSS may include at least one of, for example, a global positioning system (GPS), a global navigation satellite system (Glonass), a Beidou navigation satellite system (hereinafter, "Beidou"), or Galileo, the European global satellite-based navigation system, according to an in-use area or a bandwidth. Hereinafter, in the present disclosure, the "GPS" may be interchangeably used with the "GNSS". The wired communication may include at least one of, for example, a universal serial bus (USB), a high definition multimedia interface (HDMI), recommended standard-232 (RS232), and a plain old telephone Service (POTS).

According to various embodiments, the external device 1100 may function as a remote controller that may control the photographing apparatus. According to an embodiment, by manipulating a button 1110 formed on a front surface of the external device 1100, the external device 1100 may transmit a control signal to the photographing apparatus through the communication module, and the photographing apparatus may receive the control signal to perform a function (for example, a photographing function) that is supported by the photographing apparatus. However, the function of the electronic device 1100 is not limited thereto. According to various embodiments, the external device 1100 may receive a control signal and data from the photographing apparatus. According to various embodiments, the external device 1100 may be an external memory device. For example, the external device 1100 may store an image that is captured through the photographing apparatus.

According to various embodiments, the external device 1100 may further include a display in an area of the external appearance. The display, for example, may display various contents (for example, a text, an image, a video, an icon, or a symbol). According to various embodiments, the display may include a touch screen and receive, for example, a touch, a gesture, a proximity, or a hovering input using an electronic pen or the user's body.

According to various embodiments, the external device 1100 may include a coupling member 1130 that extend from one side surface thereof to connected to an opposite side surface thereof. According to an embodiment, the coupling member 1130 may have a flexible band form. According to various embodiments, the coupling member 1130 may have a coupling hole in an area thereof. According to an embodiment, the external device 1100 may be coupled by inserting the coupling member 1130 into the recessed part 138*b* of the leg 130. For example, the band-shaped coupling member 1130 may be inserted from a lower end to an upper end of the leg 130, and the stopper 139*c* formed in the recessed part 138*b* may be coupled to a coupling hole formed in the coupling member 1130.

Figure 12A:
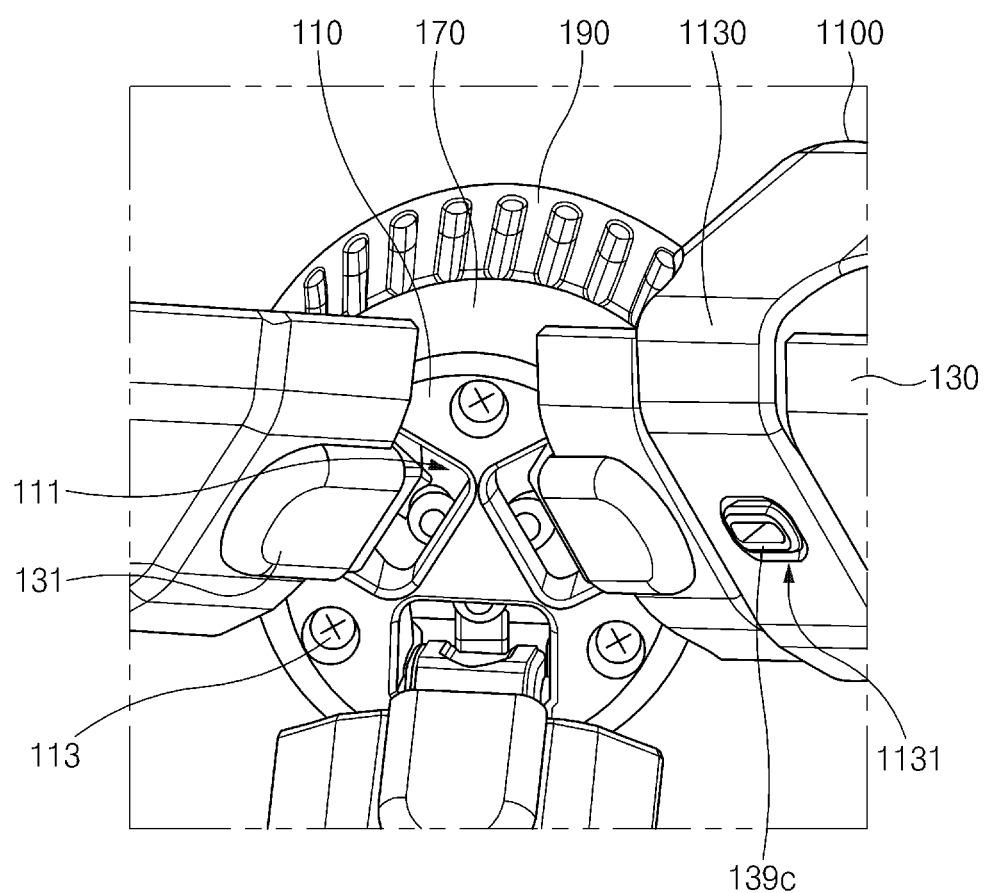
FIG. 12A is a perspective view of a portion of a tripod, to which an external device is coupled, when the tripod is viewed from the lower side according to an example embodiment.
Figure 12B:
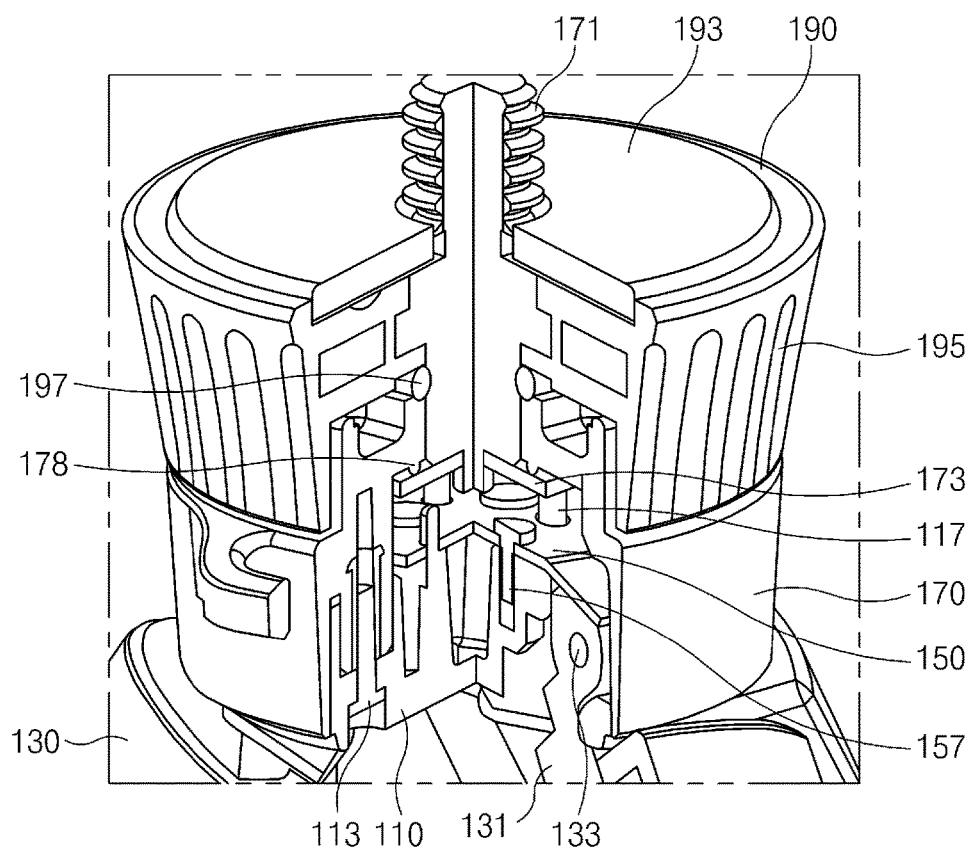
FIG. 12B is a cutaway perspective view of a portion of a tripod, to which an external device is coupled, according to an example embodiment.
Figure 12C:
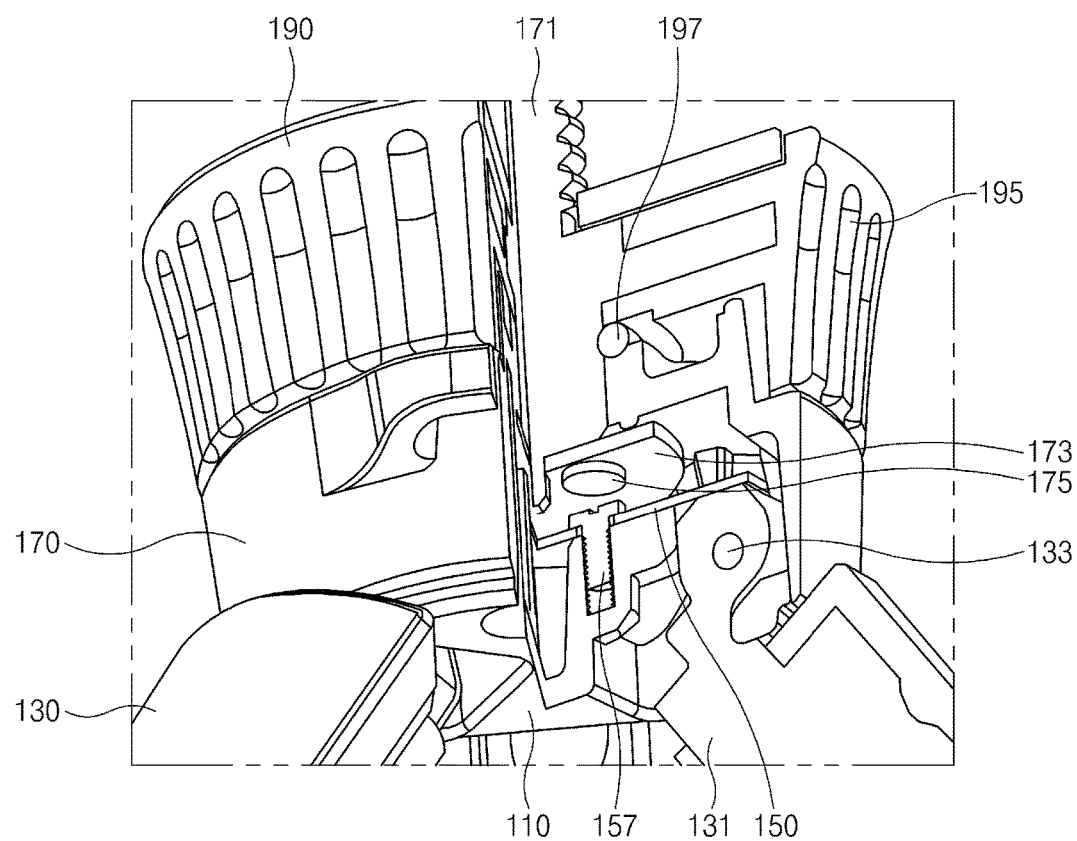
FIG. 12C is a cutaway perspective view when the tripod is viewed from the lower side according to an example embodiment.
Figure 12D:
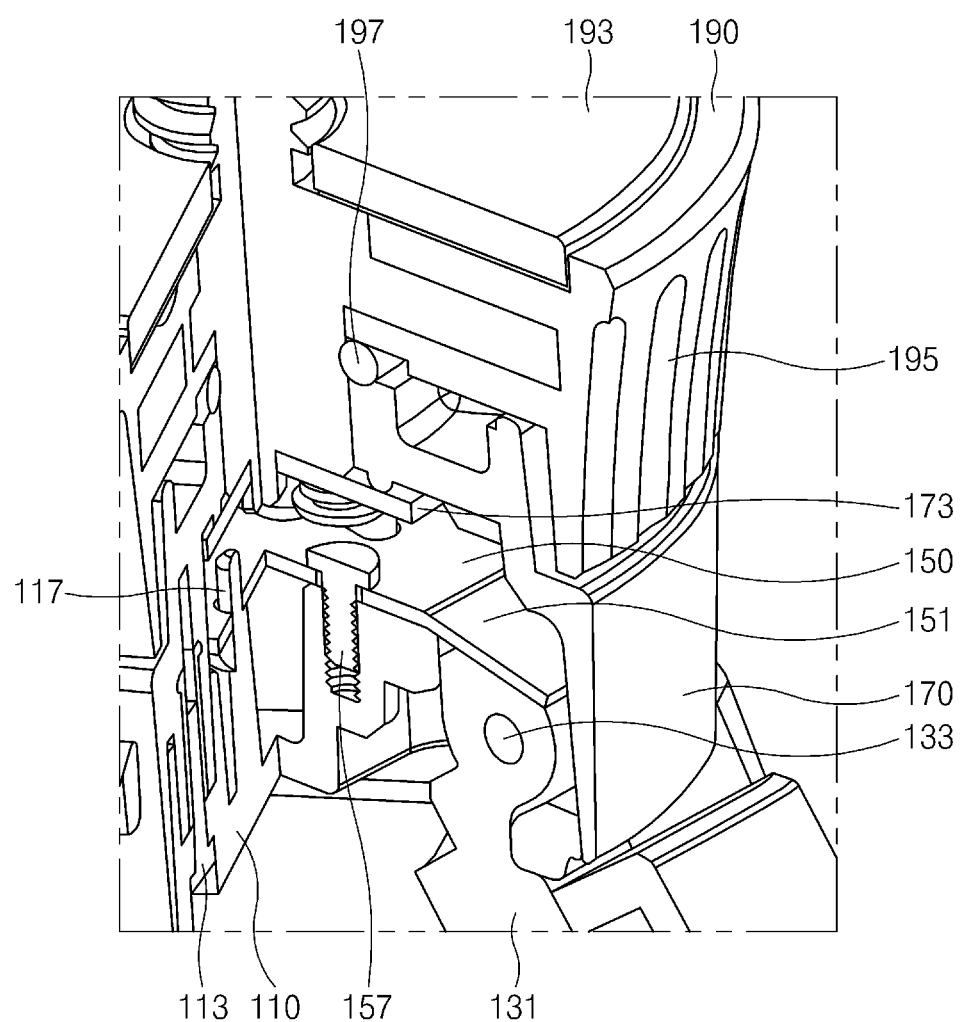
FIG. 12D is an enlarged cutaway perspective view of the portion of FIG. 12B.

FIG. 12A is a perspective view of a portion of a tripod, to which an external device is coupled, when the tripod is viewed from the lower side according to an example embodiment of the present disclosure. FIG. 12B is a cutaway perspective view of a portion of a tripod, to which an external device is coupled, according to an example embodiment of the present disclosure. FIG. 12C is a cutaway perspective view when the tripod is viewed from the lower side. FIG. 12D is an enlarged cutaway perspective view of the portion of FIG. 12B.

Referring to FIGS. 12A to 12D, the external device 1100 inserted into the leg 130 of the tripod 100 may be coupled to the leg 130 by inserting the stopper 139*c* that protrudes into the recessed part 138*b* of the leg 130 into the coupling hole 1131 arranged in an area (for example, a central portion) of the coupling member 1130. Further, the external device 1100 may be pressed and fixed to the leg 130 due to the flexibility of the coupling member 1130, and may be easily separated from the leg 130 by an external pressure of a specific magnitude. In some embodiments, a locking member (for example, a hook and loop fastener) may be provided on one surface of the external device 1100 such that the coupling member 130 may be attached and detached. In this case, the external device 1100 may be fixed to or separated from the leg 130 through the locking member even though the coupling member 1130 is not flexible.

According to various embodiments, the leg 130, to which the external device 1100 is coupled, may be inserted into and seated in the opening 111 arranged in a peripheral area of the bracket 110. If the leg 130 is inserted into the opening 111 and is seated in the bracket 110, the rotation shaft 133 is inserted into the through-hole 135 of the contact member 131 formed at an upper end of the leg 130 to be seated in the groove 111a arranged adjacent to the opening 111. Further, the resilient member 151 provided in the support member 150 that covers a portion of an upper surface of the bracket 110 may contact an upper end of the contact member 131 to apply a load to the contact member 131. In this case, if an external pressure of a specific magnitude or more is applied to the leg 130, the resilient member 151 may be moved vertically by a plurality of surfaces formed at an upper end of the contact member 131 and lines at which the plurality of surfaces are connected to each other. According to various embodiments, the support member 150 may fixed to the bracket 110 by the screw member 157.

According to various embodiments, the cover member 170 may be coupled to the rotation member 190, a portion of an upper surface of which is covered by the cover 193. According to an embodiment, the support member 170 may fixed to the bracket 190 by the screw member 175. According to various embodiments, the rotation member 190 may include a connection member, to which the photographing apparatus is coupled, and the rotation member 190 may be coupled to cover an upper surface and a portion of a side surface of the cover member 170 while the ring member 197 is inserted from a lower end to an upper end of the connection member 171. The resistance support member 173 may be inserted into the cavity 177 formed at a lower end of the cover member 170 while the rotation member 190 covers the cover member 170, and the resistance connection member 171 may be coupled to the connection member 171 by a screw member 175 such that the resistance support member 173 may be attached to a lower end of the connection member 171. In this case, a boss 178 that protrudes from an upper end of the cover member 170 at a portion of an inner surface of the cover member 170, in which the cavity 177 is formed, may contact a portion of the upper surface of the resistance support member 173 so that a frictional force may be generated when the rotation member 190 is rotated.

According to various embodiments, the bracket 110, to which the support member 150 is fixed, may be coupled to the cover member 170 coupled to the rotation member 190, through the screw member 113. According to an embodiment, the screw member 113 that is screw-coupled to the bracket 110 from a lower end to an upper end of the bracket 110 may fix the bracket 110 and the cover member 170.

As described above, according to various embodiments, a tripod for a photographing apparatus may include a plurality of legs, a bracket, to which the legs are coupled, a support member that is coupled to the bracket, and contact members, each of which defines an upper end portion of the corresponding leg. Each of the contact members may include a first surface that is situated at an upper end of the contact member and defines a first angle with a longitudinal axis of the leg, and a second surface that defines a second angle with the first surface. The first surface and the support member may contact each other when the corresponding leg is in a folding state, and the second surface and the support member may contact each other when the corresponding leg is in an unfolding state.

According to various embodiments, the first angle may be a right angle.

According to various embodiments, the bracket may include one or more openings at peripheral areas thereof. The legs may be inserted into the openings from a lower end to an upper end of the bracket such that the contact members are exposed to the outside.

According to various embodiments, the bracket may include grooves, each of which is arranged adjacent to the corresponding opening. When each of the legs is inserted into the corresponding opening, a rotation shaft that is inserted into a through-hole that extends from one side surface to an opposite side surface of the contact member may be seated in the groove.

According to various embodiments, the bracket may include one or more protrusions that protrude from an upper surface of the bracket. The support member may include one or more holes, into which the protrusions are inserted, respectively. When the protrusions are inserted into and coupled to the holes, respectively, portions of the support member may contact the contact member, respectively.

According to various embodiments, the support member may be coupled to the bracket by a screw member.

According to various embodiments, each of areas of the support member, which contact the contact members, may be formed of a resilient member that has a resilient force of a specific magnitude. In a process of changing the legs from a folding state to an unfolding state or a process of changing the legs from the unfolding state to the folding state, the resilient members may be moved vertically by lines at which the first surfaces and the second surfaces are connected to each other while a load is applied to upper ends of the contact members.

According to various embodiments, each of the resilient members may include a plate-shaped spring.

According to various embodiments, each of the legs may include at least one magnetic member at a peripheral area thereof. When the legs are in a folding state, a first magnetic member included in any one leg may be coupled to a second magnetic member included in another leg that is adjacent to the any one leg.

According to various embodiments, each of the legs may include a recessed part that is recessed at a specific width and at a specific depth at a lower end area thereof, at which the corresponding contact member is situated.

According to various embodiments, the recessed part may include a stopper that protrudes from an inner surface of the recessed part. The stopper may be inserted into a coupling hole that is formed in an external device such that the external device is coupled to the recessed part.

According to various embodiments, each of bodies of the legs may be manufactured through an insert injection-molding process. At least one magnetic member may be coupled to a peripheral area of the corresponding body. An external appearance part may be manufactured to surround the corresponding body through a second insert injection-molding process.

According to various embodiments, the tripod may further include a cover member that is coupled to the bracket, and a rotation member that is coupled to the cover member. The cover member may be coupled to the bracket to cover an upper surface and a portion of a side surface of the bracket after the bracket is inserted into a cavity formed inside the cover member.

According to various embodiments, the cover member may include a connection member, to which the photographing apparatus is coupled. The rotation member may be configured such that a screw groove formed on an inner peripheral surface of the rotation member is rotatably coupled to a screw thread formed on an outer peripheral surface of the cover member.

According to various embodiments, the connection member may include a screw thread that has a pitch that is different from the screw thread formed on the outer peripheral surface of the cover member.

According to various embodiments, the rotation member may include a connection member, to which the photographing apparatus is coupled. The rotation member may be coupled to the cover member by a screw member.

According to various embodiments, the connection member may be configured such that a lower end of the connection member protrudes from a lower surface of the rotation member, and may be exposed to the cavity through an opening formed at an upper end of the cover member.

According to various embodiments, the connection member may be coupled to a resistance support member, which is inserted into the cavity to be attached to a lower end of the connection member, by the screw member.

According to various embodiments, the cover member may include at least one boss that protrudes from an upper end of the cover member at a portion of an inner surface thereof, in which the cavity is formed. The at least one boss may contact a portion of an upper surface of the resistance support member.

According to various embodiments, the tripod may further include a ring member that has a resilient force of a specific magnitude. The ring member may surround the connection member, and may be situated between the cover member and the rotation member.

According to embodiments of the present disclosure, because the contact member includes a plurality of surfaces, which contact the support member, the legs may define at least one specific angle with the central axis of the tripod when the states of the legs are changed.

Further, according to embodiments of the present disclosure, because the rotation shaft of the leg is seated in the bracket and the leg is coupled to the bracket by applying a load to the contact member through a support member, the leg may be coupled to the bracket without having to use a+ screw member.

Further, according to embodiments of the present disclosure, because the cover member covers a portion of the bracket, the rotation shaft of the leg is prevented from being exposed to the outside, which increases the quality of the external appearance.

Further, according to embodiments of the present disclosure, the rotation member may be rotated to convert the direction of the photographing apparatus.

In addition, the present disclosure may provide various effects that are directly or indirectly recognized.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of a dedicated processor, a CPU, an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor, the processor may perform functions corresponding to the instructions. The computer-readable storage medium may be, for example, the memory.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been illustrated and described with reference to various example embodiments thereof, it will be understood by those skilled in the art that various changes in form and details may be made therein without departing from the scope of the present disclosure. Therefore, the scope of the present disclosure should not be defined as being limited to the various embodiments, but should be defined by the appended claims and equivalents thereof.

What is claimed is:

1. A tripod for a photographing apparatus, the tripod comprising:
   a plurality of legs;
   a bracket, to which the plurality of legs is coupled;
   a support coupled to the bracket, the support comprising a plurality of resilient members respectively formed at a periphery of the support, each resilient member having a resilient force of a specific magnitude; and
   each of the plurality of legs comprising a contact member, each contact member provided at an upper end portion of the corresponding leg,
   wherein each contact member comprises:
   a first surface provided at an upper end of the contact member and defining a first angle with a longitudinal axis of the leg; and
   a second surface extending from the first surface and defining a second angle with the first surface,
   wherein the first surface and the support contact each other when the corresponding leg is in a folded state, and the second surface and the support contact each other when the corresponding leg is in an unfolded state, and wherein, when a respective one of the legs changes from the folded state to the unfolded state or from the unfolded state to the folded state, a corresponding resilient member moves by a load applied to the upper end of the corresponding contact member.

2. The tripod of claim 1, wherein the first angle is a right angle.

3. The tripod of claim 1, wherein the bracket comprises:
one or more openings at peripheral areas thereof, and
the one or more openings are configured to receive respective legs therein from a lower end to an upper end of the bracket such that the contact members are exposed to the outside.

4. The tripod of claim 3, wherein the bracket comprises:
a plurality of grooves, each groove being arranged adjacent to a corresponding opening, and
wherein, when each of the legs is inserted into a corresponding opening, a rotation shaft that is provided in a through-hole that extends from one side surface to an opposite side surface of the contact member is seated in the groove.

5. The tripod of claim 1, wherein the bracket comprises:
one or more protrusions that protrude from an upper surface of the bracket,
wherein the support comprises:
one or more holes configured to receive respective protrusions, and
wherein, when the protrusions are inserted into the respective holes, respective portions of the support contact the contact members.

6. The tripod of claim 1, wherein the support is coupled to the bracket by a screw.

7. The tripod of claim 1, wherein each of the resilient members comprises:
a plate-shaped spring.

8. The tripod of claim 1, wherein each of the legs comprises:
at least one magnet disposed at a peripheral area thereof, and
wherein when the legs are in the folded state, a first magnet included in any one leg is coupled to a second magnet included in another leg adjacent to the one leg.

9. The tripod of claim 1, wherein each of the legs comprises:
a recess that is recessed at a specific width and at a specific depth at a lower end area of the leg, at which the corresponding contact member is situated.

10. The tripod of claim 9, wherein the recess comprises:
a stopper protruding from an inner surface of the recess, wherein the stopper is provided in a coupling hole of an external device such that the external device is coupled to the recess.

11. The tripod of claim 1, wherein body of each of the legs is injection-molded, at least one magnet is coupled to a peripheral area of the corresponding body, and an external appearance part is injection-molded to surround the corresponding body.

12. The tripod of claim 1, further comprising:
a cover coupled to the bracket; and
a rotation member coupled to the cover,
wherein the cover is coupled to the bracket to cover an upper surface and a portion of a side surface of the bracket, the bracket being disposed in a cavity formed inside the cover.

13. The tripod of claim 12, wherein the cover comprises:
a connection member, configured for coupling to the photographing apparatus, and
wherein the rotation member comprises a screw groove provided on an inner peripheral surface thereof and is rotatably coupled to a screw thread formed on an outer peripheral surface of the cover.

14. The tripod of claim 13, wherein the connection member comprises:
a screw thread having a pitch different from the screw thread formed on the outer peripheral surface of the cover member.

15. The tripod of claim 12, wherein the rotation member comprises:
a connection member configured for coupling to the photographing apparatus, and
wherein the rotation member is coupled to the cover member by a screw.

16. The tripod of claim 15, wherein a lower end of the connection member protrudes from a lower surface of the rotation member, and is exposed to the cavity through an opening formed at an upper end of the cover member.

17. The tripod of claim 16, wherein the connection member is coupled to a resistance support, which is disposed in the cavity and attached to a lower end of the connection member, by the screw.

18. The tripod of claim 17, wherein the cover comprises:
at least one boss that protrudes from an upper end of the cover at a portion of an inner surface of the cover, in which the cavity is formed, and
wherein the at least one boss contacts a portion of an upper surface of the resistance support.

19. The tripod of claim 15, further comprising:
a ring having a resilient force of a specific magnitude,
wherein the ring surrounds the connection member, and is provided between the cover and the rotation member.

* * * * *